US011115720B2

(12) United States Patent
Kedenburg, III

(10) Patent No.: US 11,115,720 B2
(45) Date of Patent: Sep. 7, 2021

(54) PROVIDING A LIVE POLL WITHIN A VIDEO PRESENTATION

(71) Applicant: Facebook, Inc., Menlo Park, CA (US)

(72) Inventor: George Lewis Kedenburg, III, San Francisco, CA (US)

(73) Assignee: FACEBOOK, INC., Menlo Park, CA (US)

(*) Notice: Subject to any disclaimer, the term of this patent is extended or adjusted under 35 U.S.C. 154(b) by 0 days.

(21) Appl. No.: 15/370,594

(22) Filed: Dec. 6, 2016

(65) Prior Publication Data

US 2018/0160180 A1    Jun. 7, 2018

(51) Int. Cl.
*H04N 21/4788* (2011.01)
*H04N 21/475* (2011.01)
*H04N 21/235* (2011.01)

(52) U.S. Cl.
CPC ..... *H04N 21/4758* (2013.01); *H04N 21/4788* (2013.01); *H04N 21/235* (2013.01)

(58) Field of Classification Search
None
See application file for complete search history.

(56) References Cited

U.S. PATENT DOCUMENTS 9,317,574 B1* 4/2016 Brisebois ............ G06F 16/254
9,465,505 B1* 10/2016 Moody ................ H04N 7/147
2003/0196206 A1* 10/2003 Shusman ............ G06Q 30/02 725/91
2005/0054286 A1* 3/2005 Kanjilal ............ H04N 21/8113 455/3.05
2005/0065632 A1* 3/2005 Douglis ................ H04L 29/06 700/200
2007/0022437 A1* 1/2007 Gerken ............ H04N 7/17318 725/41
2008/0065507 A1* 3/2008 Morrison ........... G06Q 30/0613 705/26.3
2008/0086742 A1* 4/2008 Aldrey ................ H04H 60/33 725/24
2009/0019467 A1* 1/2009 Kim .................... H04N 7/17318 725/14
2009/0037277 A1* 2/2009 Zuckerberg ............ G06Q 30/02 705/14.19
2010/0161635 A1* 6/2010 Dey .................... G06Q 30/0241 707/758
2011/0289431 A1* 11/2011 Olumoko ........... G06Q 30/0203 715/753
2012/0204202 A1* 8/2012 Rowley .................. A63F 13/52 725/12

(Continued)

*Primary Examiner* — William J Kim
(74) *Attorney, Agent, or Firm* — Keller Jolley Preece

(57) ABSTRACT

The present disclosure is directed toward systems and methods for providing a live poll with a video presentation. In particular, the systems and methods described herein provide a video stream received from a broadcaster client device to one or more viewer client devices. Additionally, the systems and methods described herein provide a live poll to the one or more viewer client devices together with the video stream. The systems and methods receive poll responses from the one or more viewer client devices, compile poll results based on the received responses, and provide the poll responses to the broadcaster client device and the one or more viewer client devices.

20 Claims, 13 Drawing Sheets

(56) References Cited

U.S. PATENT DOCUMENTS

| | | | |
|---|---|---|---|
| 2013/0205322 A1* | 8/2013 | Sinha | G06T 1/0021 |
| | | | 725/19 |
| 2013/0312041 A1* | 11/2013 | Gresta | H04N 21/2365 |
| | | | 725/61 |
| 2014/0215506 A1* | 7/2014 | Kalmes | H04N 21/25841 |
| | | | 725/14 |
| 2015/0052012 A1* | 2/2015 | Eramian | G06Q 30/0609 |
| | | | 705/26.35 |
| 2015/0311992 A1* | 10/2015 | Aston | H04H 60/33 |
| | | | 725/24 |
| 2016/0086205 A1* | 3/2016 | Dove | H04L 67/306 |
| | | | 705/7.32 |
| 2016/0366464 A1* | 12/2016 | Rouady | H04N 21/4312 |
| 2017/0111418 A1* | 4/2017 | Warren | H04N 21/4758 |

* cited by examiner

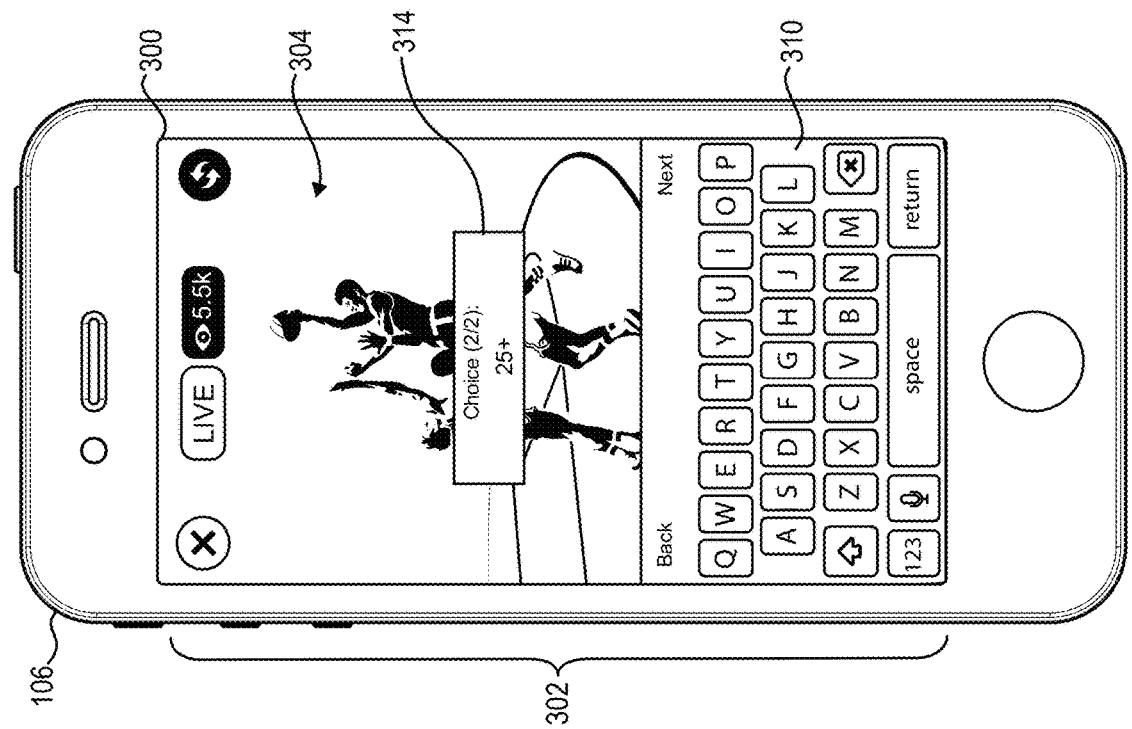
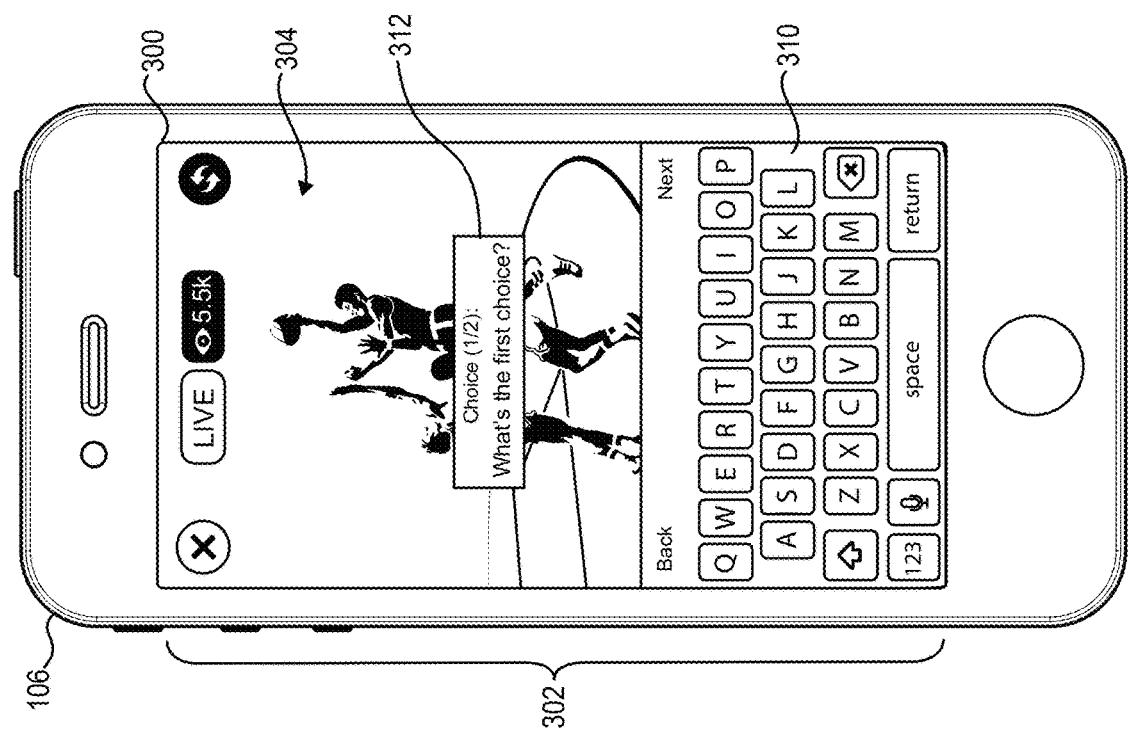

PROVIDING A LIVE POLL WITHIN A VIDEO PRESENTATION

BACKGROUND

Due to rapid development in computer and communication technology, individuals are able to easily communicate and connect with other individuals. Indeed, as a result of the proliferation of smartphones and other computer devices, individuals have access to many forms of digital communication that allow individuals to communicate with large groups of people across the world (e.g., through a social network). For example, various conventional systems allow an individual to communicate with an audience of users (e.g., other social network users) by, for example, sharing a post, updating a status, or sharing a picture or video. While many conventional systems are effective in allowing individuals to communicate a message with an audience, these conventional systems have various disadvantages.

For example, although conventional systems provide various ways for users to send and respond to communications, conventional systems often lack the ability to create an engaging shared user experience for recipient users (e.g., users within an audience). From the perspective of a recipient user that receives a communication, conventional systems provide communication tools that often make the recipient user feel like an outsider looking into a discrete life moment of the sender user (e.g., viewing a posted message). Moreover, even though many conventional systems allow a recipient user to respond to a posted message (e.g., reply with a comment), oftentimes comments appear to be ignored or simply lost in the "noise" of a large number of comments provided by other recipient users. Accordingly, conventional systems can often create a sense of disengagement for recipient users receiving digital communications.

Additionally, conventional systems do not effectively provide a sender user the ability to gather overall feedback from an audience of recipient users. From the perspective of a sender user that shares content within conventional systems, a sender user often cannot accurately gauge the response of recipient users within an audience. For example, while conventional systems allow recipient users to individually react to a sender user's communication, conventional systems often provide the audience reactions to a sender user in an unorganized and/or unconcise manner. For example, user feedback channels in conventional systems generally do not have constraints (e.g., recipient users react with messages/posts/comments from any place at any time), which can result in difficulty for a sender user to effectively gain an understanding of what recipient users are thinking in response to a communication from the sender user. This problem is compounded as the size of an audience becomes larger and larger. Thus, the manner in which conventional systems provide audience reaction to shared content is often ineffective in providing a sender user informative and useful audience feedback.

Due to the above-discussed reasons, conventional systems often do not create a gratifying shared experience between a sender user and an audience. To elaborate, conventional systems rely on discrete, alternating one-way communications shared between a sender user and recipient users. Indeed, conventional systems enable a sending user to send a communication (e.g., create a post) to which recipient users then respond (e.g., comment) in a turn-by-turn style of interaction. They turn-by-turn nature of conventional systems often disconnects a sender user from an audience, and as the number of recipient users in an audience grows, the turn-by-turn nature further exacerbates the disconnection. Thus, conventional systems often fail to create a satisfying shared experience between a sender user and recipient users within an audience.

Thus, there are several disadvantages with regard to conventional communication systems and methods.

SUMMARY

One or more embodiments described herein provide benefits and solve one or more of the foregoing or other problems in the art with systems and methods for providing a live poll with a video stream. In general, the systems and methods enable a broadcasting user to include a live poll in combination with a video stream, and the systems and methods further provide the live poll and video stream to viewing users. More particularly, the systems and methods enable the broadcasting user to create a live poll in conjunction with the video stream by guiding the broadcasting user through steps to create the live poll. For example, the systems and methods provide a template for generating poll questions and answer choices to the broadcasting user.

Additionally, the systems and methods provide the live poll and the video stream to viewing users, enabling the viewing users to respond to the live poll while viewing the video stream. For example, the systems and methods provide, simultaneously with the video stream, a poll interface of the poll questions and answer choices to the viewing users. Moreover, the systems and methods described herein receive poll responses and/or collect poll results by way of user responses input via the poll interface. The systems and methods also provide the poll responses and/or results to the broadcasting user and the viewing users upon completion of the live poll.

Furthermore, the systems and methods described herein provide a more satisfying user experience by increasing user engagement. In particular, the systems and methods increase user engagement by providing live feedback from potentially large numbers of users in a way that both the broadcasting user and the viewing users share the same experience.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIGS. 3A-3F illustrate a series of graphical user interfaces for creating a live poll in accordance with one or more embodiments;

FIGS. 4A-4D illustrate a series of graphical user interfaces for providing a video stream and a live poll to a user in accordance with one or more embodiments;

DETAILED DESCRIPTION

Figure 1:
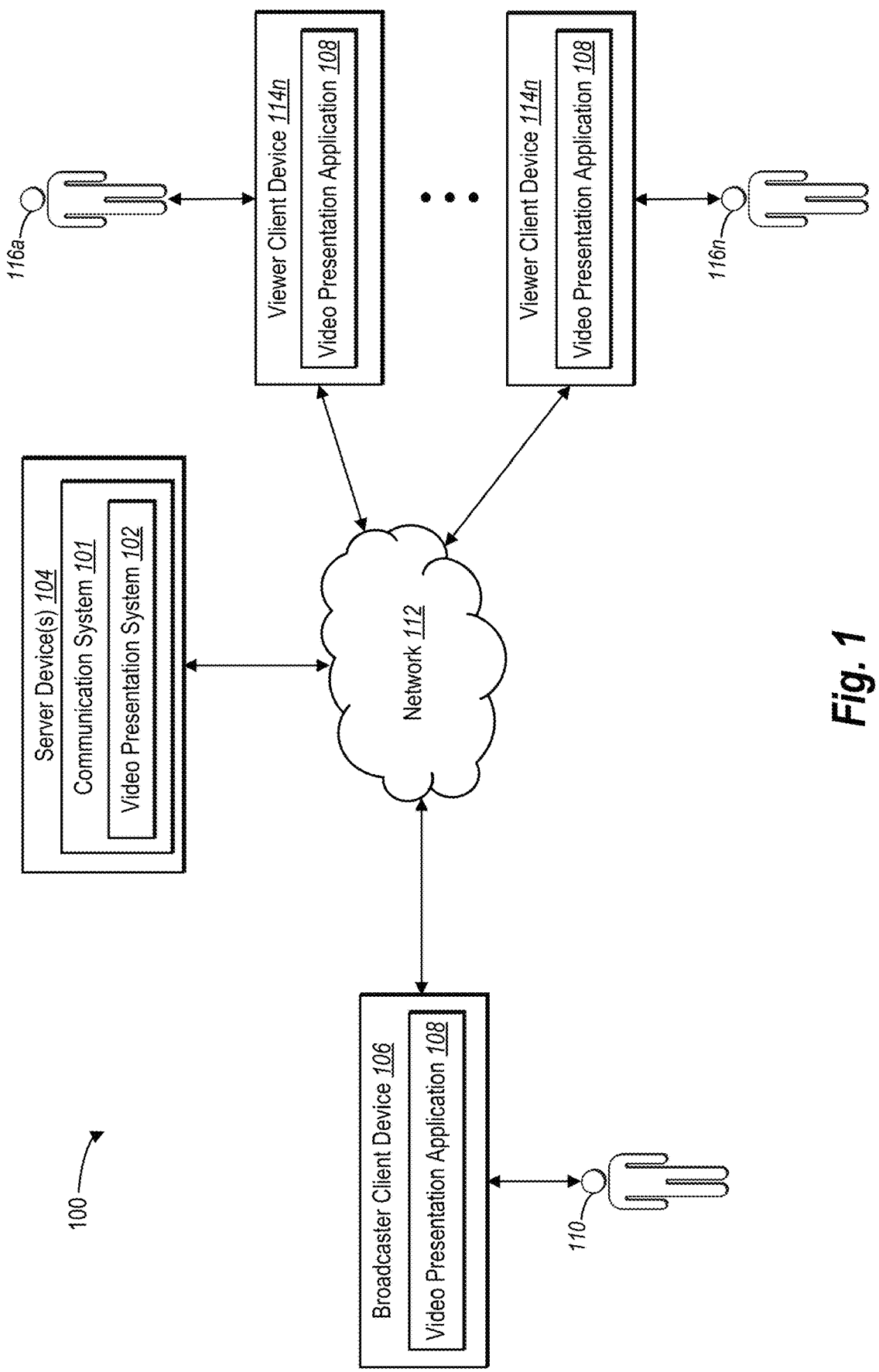
FIG. 1 illustrates a schematic diagram of an example environment in which the video presentation system operates in accordance with one or more embodiments.

One or more embodiments described herein provide benefits and solve one or more of the foregoing or other problems in the art with a video presentation system that provides a live poll in conjunction with a video stream. For example, the video presentation system provides a video stream received from a broadcaster client device (e.g., a mobile device associated with a broadcasting user) to one or more viewer client devices. In conjunction with the video stream, the video presentation system further provides a live poll created by a broadcasting user to the viewer client devices. In particular, in one or more embodiments, the video presentation system sends a live poll indication to each of the viewer client devices that causes each of the viewer client devices to present a graphical poll interface simultaneously with the presentation of the video stream from the broadcaster client device.

In some embodiments, the graphical poll interface includes one or more poll questions created by the broadcasting user, with each poll question having one or more corresponding answer choices. The video presentation system enables viewing users associated with the one or more viewer client devices to participate in the live poll by submitting responses to the questions created by the broadcasting user via the graphical poll interface (e.g., by selecting one of the answer choices). The video presentation system receives the viewing user responses and provides a poll result to the broadcasting user and the viewing users by way of the respective client devices (i.e., the broadcaster client device and the one or more viewer client devices). Accordingly, the sending user and the one or more viewing users within a video stream audience are mutually engaged within the same moment by participating in a live poll provided in combination with a video stream.

In order to provide a live poll in conjunction with a video stream, some embodiments of the video presentation system provide a guided process to allow a broadcasting user to use a broadcaster client device to create a live poll while also streaming a video. For example, based on input from a broadcasting user, the video presentation system receives a request from a broadcaster client device to create a live poll in relation to a video stream. In response to receiving the request to create a live poll, the video presentation system provides a guided process to allow the broadcasting user to create the live poll on the broadcaster client device. In particular, the video presentation system provides a poll creation interface by way of the broadcaster client device to guide the broadcasting user through steps to create a live poll. The poll creation interface includes a template to prompt the broadcasting user to provide various poll elements (e.g., questions and corresponding answer choices). Thus, the video presentation system guides the broadcasting user through creating a live poll to present in conjunction with a video stream.

After the broadcasting user provides the various poll elements, the broadcaster client device can provide a live poll request to initiate a live poll that includes the various poll elements (e.g., questions and answer choices). In response to receiving the live poll request, the video presentation system initializes the live poll, which results in the viewer client devices presenting a graphical poll interface with the video stream from the broadcaster client device. For example, in one or more embodiments, the video presentation system provides a live poll indication to one or more viewer client devices that causes each of the viewer client devices to present a graphical poll interface with the video stream. The graphical poll interface includes a presentation of the poll elements (e.g., the questions and corresponding answer choices) input by the broadcasting user.

Additionally, in one or more embodiments, the graphical poll interface includes selectable options enabling viewing users associated with the viewer client devices to provide user input with respect to the live poll. In particular, for example, the video presentation system receives a response from each viewer client device based on a viewing user selecting an answer choice option within the graphical poll interface. Additionally, the video presentation system compiles poll results based on the received responses. For example, the video presentation system receives responses from multiple viewer client devices and provides a collective poll result within the graphical poll interface. Moreover, the video presentation system updates the collective poll result as individual viewing users submit additional responses to the live poll. In other words, as the video presentation system receives each poll response, the video presentation system updates the poll results, on both the broadcaster client device as well as the to reflect the collective response of the viewing users to the poll questions.

Accordingly, the video presentation system described herein creates an engaging shared user experience for both viewing users as well as broadcasting users. From the perspective of a viewing user, the video presentation system provides an increased sense of engagement with the broadcasting user by providing a live poll simultaneously with a video stream. Indeed, the video presentation system enables a viewing user to contribute to the shared user experience through responding to poll questions while viewing the video stream. In addition, by compiling and providing poll results based on other viewing user's responses, the video presentation system creates a sense of inclusion in the shared user experience for the viewing users. By considering each user response to compile poll results, the video presentation system engages viewing users more effectively by allowing a viewing user to efficiently and quickly understand other viewing user's opinions compared to their own in real-time (or near real-time) while also experiencing the video content within a video stream. Thus, the video presentation system provides a more engaging shared user experience for viewing users.

The video presentation system described herein also more effectively provides a broadcasting user the ability to gather clear feedback from an audience. From the perspective of a broadcasting user who broadcasts a video stream, the broadcasting user can more accurately gauge the response of viewing users with an audience. The video presentation system described herein provides audience reactions and/or responses to the broadcasting user in an organized and concise manner that can be understood during the broadcast of a live video stream. Thus, by considering each received response, the video presentation system described herein provides a broadcasting user with more informative and useful feedback.

Moreover, in some embodiments, the video presentation system enables only those users who are currently viewing the video stream to participate in the live poll. Thus, the video presentation system gathers more accurate and understandable user response data by limiting the responses to only those users who are engaged in viewing the video stream. In short, and in contrast to conventional systems, the video presentation system includes constraints on who can participate in the live poll and the manner by which each participant (e.g., viewing user) can respond. Therefore, regardless of the size of an audience, a broadcasting user can request and receive valuable feedback from the viewing users within the audience during the broadcast of the video (as opposed to receiving comments hours later, days later, weeks later, or even months later).

Due to the above-discussed and reasons, as well as the details discussed further below, the video presentation system creates a genuine shared experience between a broadcasting user and an audience of viewing users. Put simply, the video presentation system creates a user experience with an increased sense of engagement by generating a content sharing environment in which viewing users simultaneously view a video stream, receive a live poll, respond to the live poll, and view poll results. Additionally, the video presentation system accommodates responses from potentially large numbers of viewing users, without neglecting or burying responses from any of the viewing users. The video presentation system also provides the poll results to each viewing user and the broadcasting user and updates the poll results as user responses are received. Thus, the video presentation system enables potentially large numbers of viewing users to interact with a broadcasting user in an engaging shared user experience.

Moreover, the video presentation system described herein provides a shared user experience while consuming less computer memory and minimizing communication bandwidth. In particular, the video presentation system provides a graphical poll interface to viewer client devices and a graphical menu interface to the broadcaster client device, both of which perform much of the more resource intensive processes. In other words, the video presentation system offloads costly operations by coordinating poll creation on the broadcaster client device, administrating poll presentation on the viewer client devices, and relaying collected poll result data between broadcaster client devices and viewer client devices instead of implementing poll creation, poll administration, and poll result collection all at a server of the video presentation system. Thus, the video presentation system uses less memory, minimizes communication resources, and provides an engaging shared user experience more quickly and efficiently as compared to conventional systems.

Additional detail will now be provided with regard to the figures. For example, FIG. 1 illustrates a schematic diagram of an example communication environment 100 for implementing the video presentation system in accordance with one or more embodiments. An overview of the communication environment 100 is described in relation to FIG. 1. Thereafter, a more detailed description of the components and processes of the video presentation system and other components within the communication environment 100 is provided in relation to subsequent figures.

As illustrated by FIG. 1, in one or more embodiments, the communication environment 100 includes a broadcaster client device 106 associated with a broadcaster 110 (e.g., broadcasting user). The communication environment 100 also includes one or more viewer client devices 114a-114n associated with viewers 116a-116n (e.g., viewing users). As shown in FIG. 1, viewer client device 114a is associated with viewer 116a and viewer client device 114n is associated with viewer 116n. As further shown in FIG. 1, the viewer client devices 114a-114n and the broadcaster client device 106 communicate with server device(s) 104 via network 112. For example, and as FIG. 1 illustrates, server device(s) 104 can include a communication system 101 (e.g., a social networking system) having a video presentation system 102. In one or more embodiments, the broadcaster client device 106 and the viewer client devices 114a-114n may directly communicate with the server device(s) 104, bypassing network 112.

As further illustrated in FIG. 1, the communication environment 100 includes any potential number of viewers 116a-116n associated with corresponding viewer client devices 114a-114n. For discussion purposes, it will be beneficial to explain the operations and processes of the video presentation system 102 with reference to a single viewer client device (e.g., viewer client device 114a). It will be understood, however, that the video presentation system communicates with any number of viewer client devices.

The broadcaster client device 106 and the viewer client devices 114a-114n can be any of various types of computing devices. For example, each of the broadcaster client device 106 and the viewer client devices 114a-114n may be a mobile device such as a smartphone, PDA, tablet, laptop, etc. Additionally or alternatively, the broadcaster client device 106 and the viewer client devices 114a-114n may include a non-mobile device such as a desktop computer or other type of computing device as explained further below with reference to FIG. 7. In addition, the broadcaster client device 106 and the viewer client devices 114a-114n can include the same type of functionality, but need not be the same type of device.

As further illustrated in FIG. 1, the broadcaster client device 106 and the viewer client devices 114a-114n can each include a video presentation application 108. In one or more embodiments, the video presentation application 108 is installed as software, hardware, or a combination of software and hardware on the broadcaster client device 106 and viewer client devices 114a-114n. In still other embodiments, the video presentation application 108 is implemented across the communication environment 100, where all or part of the software or hardware associated with the video presentation application 108 is run on the broadcaster client device 106, the server device(s) 104, and/or the viewer client devices 114a-114n.

As will be described in more detail below with reference to FIGS. 3A-3F and FIGS. 4A-4D, the components of the communication environment 100 can provide, along and/or in combination with the other components, one or more graphical user interfaces ("GUIs"). In particular, the video presentation application 108 on each of the broadcaster client device 106 and the viewer client devices 114a-114n can display one or more GUIs generated by the broadcaster client device 106, the viewer client devices 114a-114n, and/or the video presentation system 102. The video presentation applications 108 can allow a user to interact with a collection of display elements provided within one or more GUIs for a variety of purposes as discussed in detail below with reference to subsequent figures.

As mentioned above, a broadcaster (e.g., broadcaster 110) can configure a live poll to be provided in conjunction with a video presentation associated with the broadcaster client device 106. As used herein, the term "broadcaster" means a user of the video presentation system 102 that provides a video presentation to an audience of viewing users or "viewers." The broadcaster 110 can be a person, merchant, business, or other organization. As used herein, the term "viewer" means a user of the video presentation system 102 that receives transmission or streaming of a video presentation provided by the broadcaster 110 by way of an associated viewer client device 114a-114n.

As further shown in FIG. 1, the video presentation system 102 can be part of a communication system 101. The communication system can be any electronic or digital system that facilitates electronic communication between two or more computing devices (e.g., broadcaster device 106 and viewer client device 114a. For example, the communication system can include an instant messaging system, video sharing system, or other communication system. In one or more embodiments, the communication system 102 can include a social networking system, the details of which are further described below with reference to FIGS. 8 and 9.

As indicated above, the video presentation system 102 can communicate with one or more of the viewer client devices 114a-114n and the broadcaster client device 106 via the network 112. The network 112 may include one or more networks and may use one or more communication platforms or technologies suitable for transmitting data and/or communication signals, as further described with reference to FIGS. 7 and 8. Although FIG. 1 illustrates a particular arrangement of the server device(s) 104, broadcaster device 106, and viewer client devices 114a-114n, various additional or alternative arrangements are possible.

Generally speaking, the communication environment 100 facilitates the broadcast of a video stream from the broadcasting client device 106 to one or more viewer client devices 114a-114n. As used herein, the term "video stream" refers to a digital media presentation that originates from a client device for presentation on one or more additional client devices. For example, a broadcaster client device can provide a video stream contemporaneously with capturing video content using a camera on the broadcaster client device (e.g., the video stream is a real-time or near real-time broadcast of captured video content). In other embodiments, however, a video stream can include video content from a video file (e.g., from previously captured video).

Figure 2A:
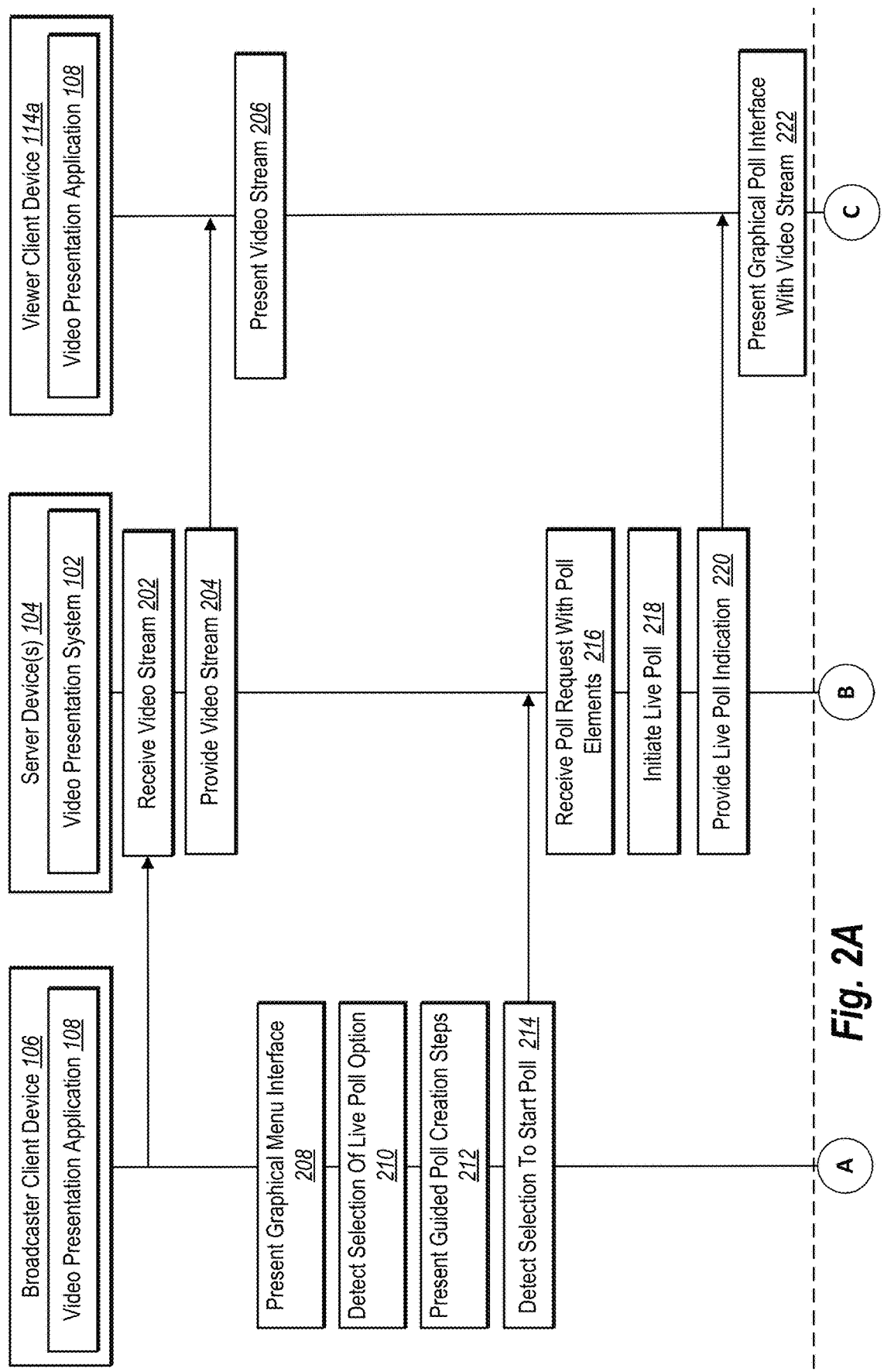
FIGS. 2A-2B illustrate a sequence flow diagram for a video presentation system in accordance with one or more embodiments.
Figure 2B:
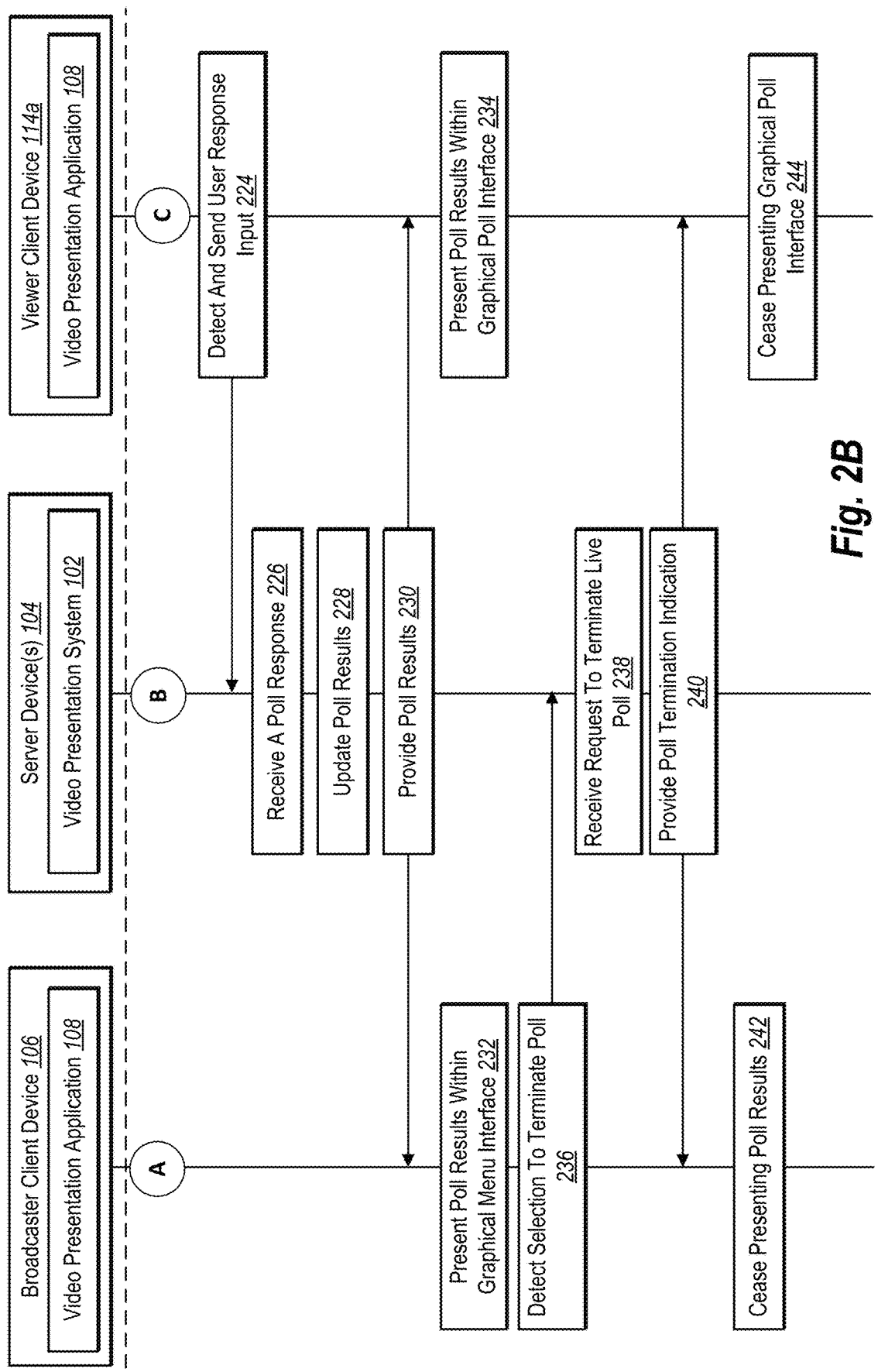

Referring now to FIGS. 2A-2B, a sequence diagram of the video presentation system (e.g., video presentation system 102) is shown. The sequence includes a number of acts in an example embodiment of the video presentation system 102. The acts illustrated in FIGS. 2A-2B are performed, respectively, by the broadcaster client device 106, the server device(s) 104, and/or the viewer client device 114a, each executing instructions using one or more processors. As shown, FIG. 2A includes the broadcaster client device 106 and the viewer client device 114a each including the video presentation application 108, and the server device(s) 104 including the video presentation system 102, which can refer to the same devices, systems, and applications as discussed above with respect to FIG. 1.

In one or more embodiments, as illustrated in FIG. 2A, the video presentation system 102 communicates with the video presentation application 108 on each of the broadcaster client device 106 and the viewer client device 114a. For example, and as shown in act 202, the video presentation system 102 receives a video stream from the broadcaster client device 106. In particular, for example, the broadcaster 110 uses the video presentation application 108 to cause the broadcaster client device 106 to capture video content and send a video stream with the video content. Accordingly, the video presentation system 102 receives the video stream sent by the broadcaster client device 106. In some embodiments, the video presentation application 108 causes the broadcaster client device 106 to contemporaneously capture and broadcast "live" video to the video presentation system 102, which in turn provides the "live" video stream to an audience of viewers (e.g., viewer 114a). In other embodiments, the broadcaster device 106 broadcasts a presentation of a video captured at a previous point in time, although the broadcaster device provides the video stream including the previously captured video content as an active (e.g., real-time or near real-time) steam to the video presentation system 102.

As shown in FIG. 2A, the video presentation system 102 provides the video stream to the viewer client device 114a, illustrated in act 204. In particular, the video presentation system 102 transmits the video stream received from the broadcaster client device 106 in response to the broadcaster 110 selecting to broadcast the video stream. In some embodiments, the video presentation system 102 provides the video stream (act 204) by communicating with the video presentation application 108 on the viewer client device 114a (e.g., via network 112) and causing the video presentation application 108 to present the video stream to the viewer 116a.

Indeed, illustrated in act 206 shown of FIG. 2A, the viewer client device 114a presents the video stream that the video presentation system 102 provides. As mentioned, the video presentation application 108 on the viewer client device 114a presents the video stream. For example, in one or more embodiments, the video presentation application 108 displays a GUI on the viewer client device 114a that includes video content of the video stream and accompanying user-selectable options (e.g., "share," "like," etc.). The display of the GUI and the selectable options within the viewer client device 114a are discussed in further detail below with reference to FIGS. 4A-4D.

In act 208 illustrated in FIG. 2A, the broadcaster client device 106 presents a graphical menu interface within the video presentation application 108. As used herein, a graphical menu interface is a GUI or a portion of a GUI displayed on the broadcaster client device 106 and that includes interactive components (e.g., a menu of selectable options), including an option to create a live poll along with other selectable options. In one or more embodiments, the graphical menu interface is not necessarily a fixed interface, but may change in appearance and functionality throughout different steps of broadcasting a video stream and/or creating a live poll associated with the video stream, as discussed in more detail below.

In particular, the graphical menu interface includes a variety of user selectable options. In some embodiments, the graphical menu interface is overlaid on a camera feed or video capturing interface of the video presentation application 108 on the broadcaster client device 106. In addition to other selectable options, the graphical menu interface includes an option to create a live poll that, when selected by the broadcaster 110, causes the video presentation application 108 to present one or more GUIs depicting a guided process of creating a live poll. The GUIs displayed by the broadcaster client device 106 throughout the poll creation process are discussed in more detail below with reference to FIGS. 3A-3F.

As mentioned, and as shown in act 210 of FIG. 2A, the broadcaster client device 106 detects a selection of a live poll option from within the graphical menu interface. In particular, the broadcaster client device 106 detects that the broadcaster 110 selects an option to create a live poll from within the variety of options included in the graphical menu interface presented in step 208. For example, in one or more embodiments the broadcaster client device 106 detects a touch gesture (e.g., tap gesture) or other user input (e.g., voice command) provided by the broadcaster 110 to select the option to create a live poll in conjunction with the video stream.

In response to detecting the selection of the live poll option, and as shown in act 212 of FIG. 2A, the video presentation application 108 causes broadcaster client device 106 to present a guided process (e.g., various GUIs) to guide the broadcaster 110 through the poll creation process. For example, in one or more embodiments, the video presentation application 108 causes the broadcaster client device 106 to display a series of successive GUIs that guide the broadcaster 110 through creating a live poll, which can include prompting the broadcaster 110 to input one or more poll elements. As used herein, the term "poll element" refers to a user input information used to define a live poll. For example, a poll element can include a poll question and a poll answer choice. In addition, poll elements can further include the type of poll, poll settings, poll aesthetics, poll format, and other accompanying features set or created by the broadcaster 110 during the poll creation process. In one or more embodiments, the poll elements can also include target audience demographic information. For example, in these embodiments the broadcaster 110 can limit the viewer client devices (e.g., to a subset of viewer client devices within the viewer client devices 114a-114n that are streaming the video feed) that receive the live poll by setting demographic information (e.g., age, geographic location, gender, occupation, or any other demographic information) to target those viewers whose user profile (e.g., a social networking profile) matches the demographic settings.

Figure 3B:
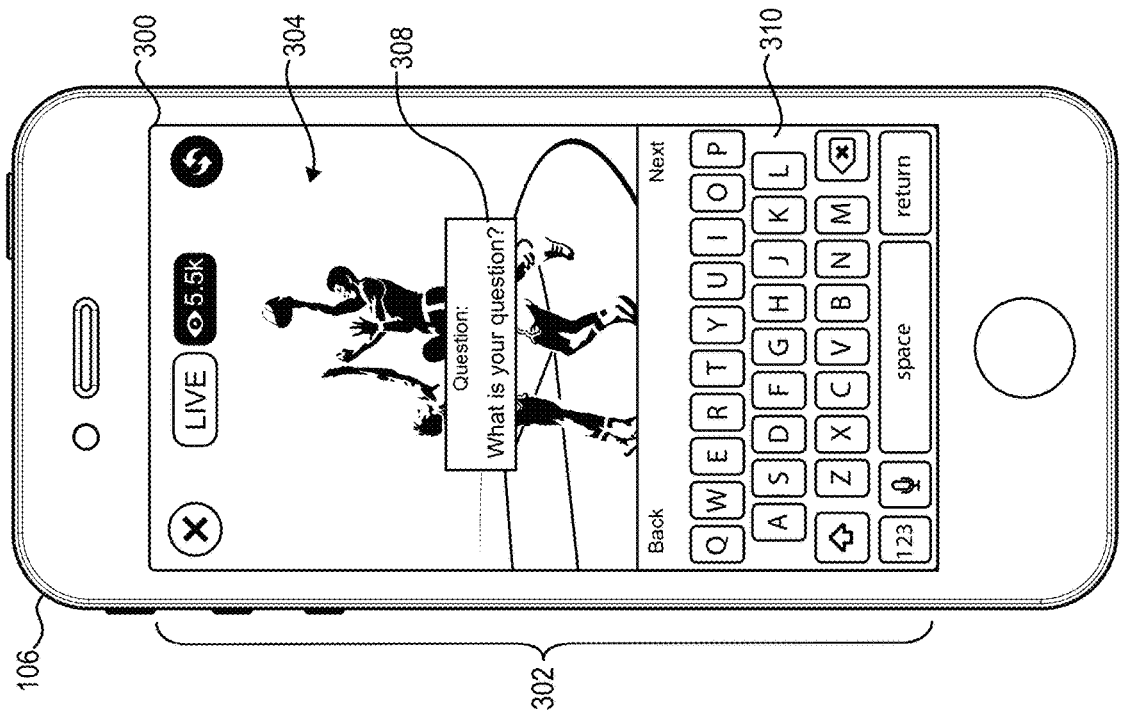

Indeed, the graphical menu interface provides instructions or guided steps to iteratively "walk" the broadcaster 110 through creating the live poll. The guided process of creating a live poll may include a number of steps, where the video presentation application 108 on the broadcaster client device 106 displays a different GUI (e.g., as part of the graphical menu interface) for each step of the process. For example, the graphical menu interface provides a template for the first step of creating a poll question. Thereafter, the graphical menu interface provides templates for each successive step, such as creating answer choices for the poll question. Additional detail of the GUIs depicted in FIGS. 3B-3D is provided below in the corresponding sections of the description.

Act 214 of FIG. 2A illustrates that the broadcaster client device 106 detects a selection to start the live poll. In particular, the broadcaster client device 106 detects a user input (e.g., a touch gesture) indicating a selection by the broadcaster 110 of an option to start the live poll (e.g., a "Start Poll" button). In some embodiments, the video presentation application 108 presents the option to start the live poll upon completion of the poll creation process mentioned above with relation to act 212. That is to say, once the broadcaster 110 has followed the guided process (act 212) of creating the live poll, then the video presentation application 108 presents, within the graphical menu interface displayed on the broadcaster client device 106, a user-selectable option (e.g., a button, a link, etc.) to start the live poll, as is discussed in detail below with respect to FIG. 3E.

As further illustrated in FIG. 2A, the video presentation system 102 receives the live poll request along with a number of poll elements, as shown in act 216. In particular, upon the broadcaster client device 106 detecting a selection of an option to start the live poll, as shown in step 214, the video presentation system 102 receives a live poll request that includes the poll elements input during the guided poll creation process (e.g., act 212). Although not shown, the video presentation system 102 can perform a verification on the poll elements to ensure that the poll elements are appropriate (e.g., appropriate content for demographic of audience), or that the poll elements are understandable (e.g., that the question is not confusing). For example, the video presentation system 102 can process the various poll elements using a trained language model to detect inappropriate or confusing content within the poll elements. Upon detecting undesirable content, the video presentation system 102 can return an error message to the broadcaster client device 106 indicating the nature of the error.

As shown in act 218 of FIG. 2A, in response to receiving a poll request, the video presentation system 102 initiates a live poll. As used herein, the term "live poll" refers digital data and electronic communications that provide a prompt for a response to users within a user audience of a video stream, receives responses from users within the user audience, track responses, and provide results corresponding to the responses. Additionally, as part of initiating the live poll, the video presentation system 102 generates a poll data structure (e.g., a data object) to store poll information. In some embodiments, the poll information includes the poll elements (e.g., poll questions, answer choices, etc.), one or more poll responses, a poll result, a poll identifier, and other information associated with a poll.

In some embodiments, as part of initiating a live poll, the video presentation system 102 creates a poll identifier that the video presentation system 102 associates with the live poll. For example, the poll identifier is a digital tag, reference number, keyword, or other identification used to identify the live poll and associate the live poll. In some embodiments, the poll identifier is a reference to the user profile (e.g., social networking profile) of the broadcaster 110 and/or a reference to the video stream received by the video presentation system 102 in act 202. In any event, the poll identifier is any type of digital data used to identify and associate poll elements, responses, and other poll information with a particular live poll.

As mentioned, and as illustrated in act 220 of FIG. 2A, the video presentation system 102 provides a live poll indication to the viewer client device 114a. In some embodiments, the live poll indication is an instruction or other form of information that causes the viewer client device 114a to present a graphical poll interface together with the video stream, as discussed in further detail below. In particular, providing the live poll indication causes the viewer client device to present a graphical poll interface together with the video stream. In one or more embodiments, the video presentation system 102 provides the live poll indication to the viewer client device 114a only upon determining that the viewer 116a associated with viewer client device 114a satisfies the target audience demographic information set by the broadcaster 110, as discussed above. If, on the other hand, the video presentation system 102 determines that the viewer 116a does not satisfy the target audience demographic information (e.g., the viewer 116a is not within a specified age range or does not have a specified occupation), then the video presentation system 102 does not provide the live poll indication to the viewer client device 114a.

As used herein, a graphical poll interface is a GUI or a portion of a GUI displayed on the viewer client device 114a and that presents to the viewer 116a one or more of the poll elements (e.g., poll questions, answer choices, etc.), poll responses, comments, poll results, etc.

For example, based upon receiving the poll indication, as shown in act 222 of FIG. 2A, the viewer client device 114a presents a graphical poll interface along with the video stream presented in act 206 as described above. In particular, the video presentation application 108 on the viewer client device 114a displays the graphical poll interface together with the video stream so that both are simultaneously visible to the viewer 116a. In some embodiments, providing the live poll indication (act 220) causes the video presentation application 108 of the viewer client device 114a to overlay the graphical poll interface on top of the video stream presented on the viewer client device 114a. In these embodiments, the graphical poll interface is independent of, and separate from, the video stream displayed on the viewer client device 114a (e.g., the graphical poll interface is a graphical overlay positioned over the video stream presentation.

In some embodiments, by overlaying the graphical poll interface on top of the video stream and not integrating the two together as if they were one entity, the video presentation system 102 more efficiently handles processing of the live poll and the video stream. In particular, by overlaying the graphical poll interface, the viewer client device 114a may handle the processing of most or all of the video presentation processes (e.g., displaying the video stream, user interface, etc.), while the video presentation system 102 may handle the management and processing of the live poll (e.g., providing poll elements, results, responses, etc.). In this way, the processing load is shared across multiple devices, and is therefore more efficient as well as more responsive.

Figure 4B:
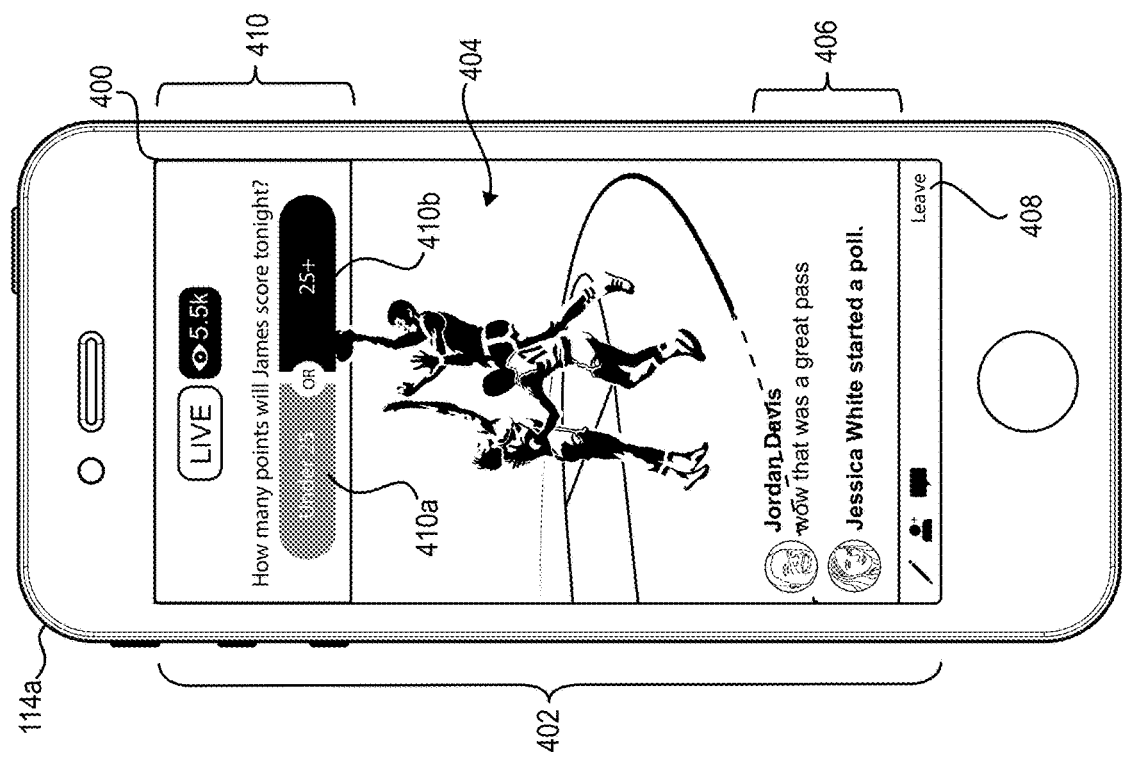

In other embodiments, providing the live poll indication (step 220) causes the video presentation application 108 to integrate (e.g., embed) the graphical poll interface within the video stream presented on the viewer client device 114a. Alternatively, the video presentation system 102 on the server device(s) 104 can also embed the graphical poll interface within the video stream prior to providing the video stream to the view client device 114a. In any case, the video presentation application 108 on the viewer client device 114a displays a graphical poll interface with the same graphical appearance—i.e., the viewer client device 114a displays both the video stream and the graphical poll interface together (e.g., see FIGS. 4B-4D). For example, as shown in FIGS. 4B-4D, the viewer client device 114a presents a graphical poll interface within a GUI that shows the live poll questions and corresponding answer choices together with the video stream provided by the video presentation system 102 and that originates at the broadcaster client device 106. As mentioned above, and as will be explained in further detail below with reference to FIGS. 4B-4D, the graphical poll interface depicts the poll elements (e.g., the poll questions, answer choices, etc.) as well as poll responses and poll results associated with the live poll created by the broadcaster 110.

Continuing the sequence diagram from FIG. 2A to FIG. 2B, act 224 of FIG. 2B illustrates that the viewer client device 114a detects user input, and in response sends a response to the live poll. In particular, the viewer client device 114a detects user input that the viewer 116a inputs by interacting with the graphical poll interface in response to a poll question of the live poll. For example, the viewer client device detects user input in the form of a selection of an answer choice corresponding to a poll question presented within the graphical poll interface of the video presentation application 108. To illustrate, as shown in FIGS. 4B-4D, the graphical poll interface presented within the video presentation application 108 portrays the poll elements (e.g., the poll questions, answer choices, etc.) to the viewer 116a. Upon detecting a selection of an answer choice or input of a response to a poll question in another format, the video presentation application 108 communicates with the video presentation system 102 (e.g., by way of network 112) and sends the response from viewer client device 114a to the viewer presentation system 102, as will be discussed further in detail below.

As illustrated in act 226 of FIG. 2B, the video presentation system 102 receives the poll response input by the viewer 116a and sent from the viewer client device 114a, as mentioned in act 224. In particular, in one or more embodiments, the received response is a selection of an answer choice for a question presented in the live poll, while in other embodiments the received response is a selection of multiple answer choices, or else a lack of a selection at all. In still other embodiments, the response is a text answer input by the viewer 116a in response to a poll question. In still other embodiments, the response is a selection of a reaction icon or other social networking interaction (e.g., a comment).

In any case, the video presentation system 102 receives the response from the viewer client device 114a and can analyze the response to compile poll results. For instance, and as further illustrated by act 228 in FIG. 2B, the video presentation system 102 updates poll results. Importantly, at any given time, the video presentation system 102 may interact with more than one viewer client device (e.g., viewer client device 114a and viewer client device 114b (not shown)), and may receive responses from each viewer client device. With each received response, the video presentation system 102 updates the poll results to reflect the responses from each viewer client device.

For example, in some embodiments the video presentation system 102 receives different responses from different viewer client devices. In these or other embodiments, the video presentation system 102 tallies or counts the number of responses for each poll question. The video presentation system 102 counts, for each poll question, the number of selections of each answer choice each time the video presentation system 102 receives a poll response (act 226). In the same or other embodiments, the video presentation system 102 totals the number of responses and/or the number of selections of each answer choice. In this way, the video presentation system 102 can compare the number of selections of the answer choices to gauge the overall response or reaction of the audience.

For example, in some embodiments such as those depicted in FIGS. 3A-3F and FIGS. 4A-4D, the poll question has a binary response—viewers choose one answer choice or the other—and the video presentation system 102 compiles results from the received responses by counting votes (e.g., by incrementing the count for an answer choice each time the video presentation system 102 receives a response (step 226) in which the viewer selected that answer choice). In act 230 of FIG. 2B, the video presentation system 102 provides poll results to both the broadcaster client device 106 and the viewer client device 114a. In particular, the video presentation system 102 provides a "live" poll result that is updated each time a new response is received (act 228). The video presentation system 102 provides poll results in the form of a total number of votes, a total number of selections per answer choice, and/or text responses input by viewers by way of viewer devices (e.g., viewer device 116a).

As shown in act 232 of FIG. 2B, the broadcaster client device 106 presents the poll results within the graphical poll interface of the video presentation application 108 on the broadcaster client device 106. Similarly, in step 234 the viewer client device 114a presents the poll results within the graphical poll interface of the video presentation application 108 on the viewer client device 114a. In some embodiments, the presentation of the poll result is in the form of a number and/or a graphical bar. For example, as mentioned above and as described in further detail below, FIG. 3F illustrates a broadcaster client device displaying a graphical bar and a tally of votes submitted by viewers based on viewer responses. Accordingly, the presentation of the poll results changes with each update of the poll results (act 228), reflecting the current poll results. Additionally, based on receiving poll results, the graphical poll interface can update or modify the size of various portions of the graphical representation of the poll results.

In one or more embodiments, the live poll can continue as long as the broadcaster user desires, as long as the broadcaster client device 106 is providing the video stream, or for a specified period of time. For instance, in some embodiments, a broadcaster can define a poll duration time when configuring the poll within the guided poll creation process. In any event, the broadcaster client device can detect a termination trigger (e.g., the end of a broadcast, the expiration of a poll duration, or a user selection from the broadcaster) to terminate the live poll. In particular, act 236 of FIG. 2B shows the broadcaster client device 106 detects a selection by the broadcaster 110 to terminate the live poll. In particular, the broadcaster client device 106 detects a selection by the broadcaster 110 of a termination or "Stop Poll" button presented within the graphical menu interface within the video presentation application 108 on the broadcaster client device 106.

In response to detecting the selection to terminate the poll, the broadcaster client device 106 can send a request to the video presentation system 102 to terminate the live poll. As shown in act 238 of FIG. 2B, the video presentation system 102 receives the request to terminate the live poll. In particular, the video presentation system 102 receives the request to terminate the live poll from the broadcaster client device 106 in response to the broadcaster 110 selecting an option to terminate the live poll. For example, the video presentation system 102 receives the request to terminate the live poll by communicating with the video presentation application 108 on broadcaster client device 106 (e.g., through network 112).

Upon receiving the request to terminate the live poll in act 238, the video presentation system 102 provides a poll termination indication to the broadcaster client device 106 and the viewer client device 114a, as illustrated in act 240. The poll termination indication causes the viewer client device 114a to cease presenting the graphical poll interface, and causes the broadcaster client device 106 to cease presenting the graphical bar or other poll result indication within the graphical menu interface, signaling the end of the live poll. For example, act 242 of FIG. 2B illustrates that the broadcaster client device 106 ceases presenting the poll results. Likewise, in act 244 of FIG. 2B, the viewer client device 114a ceases presenting the poll results. In particular, the viewer client device 114a ceases presenting poll results by removing or ceasing to present the graphical poll interface. The broadcaster client device 106, on the other hand, ceases presenting the poll results by removing the graphical bar or other poll result illustration from the graphical menu interface.

The poll termination indication does not necessarily cause the broadcaster client device 106 to cease presenting the graphical menu interface because, by maintaining a presentation of the graphical menu interface, the broadcaster client device 106 enables the broadcaster 110 to create a new poll or perform other actions with respect to the ongoing video stream presentation. Thus, the live poll is additive to the video stream and can be added and removed by the broadcaster 110 via the graphical menu interface without affecting the presentation of the video stream. Indeed, terminating the live poll refers to causing the broadcaster client device 106 and the viewer client device 114a to cease presenting any interface that depicts poll elements (e.g., questions, answer choices, etc.), poll responses, or poll results associated with the live poll while continuing to provide and share video content within a video stream that the broadcaster client device 106 broadcasts.

In some embodiments, however, terminating the live poll may cause only the viewer client device 114a to cease presenting poll elements, poll results, and poll responses, but may not cause the broadcaster client device 106 to cease presenting poll elements, results, responses, etc. In these or other embodiments, the live poll terminates without additional user interaction when the video stream is terminated such as, for example, when the broadcaster 110 ceases capturing video on the broadcaster client device 106 (i.e., when the video stream is terminated). In addition, in one or more embodiments, the results of the poll can be maintained for later access by the broadcaster or one or more of the viewer users. For example, in some embodiments, upon receiving a request to terminate a live poll, the video presentation system 102 sends the live poll results to the broadcaster and/or viewers via a timeline, newsfeed, or other electronic communication.

In additional embodiments, the video presentation system 102 causes a display of a "poll result" icon (e.g., an icon overlaid the video stream presentation) on either or both of the broadcaster client device 106 and the viewer client device 114a. Users can interact with the poll result icon (e.g., select the poll result icon) to access the poll results during the continued presentation of video stream, even though the live poll is closed and is no longer being administered. For example, upon a selection of the poll result icon, the video presentation application 108 can provide a poll result graphical interface overlaid the video stream presentation that indicates the final poll results. In addition, the poll result graphical interface can include one or more additional options that allow a user to send the poll results to one or more users that are not participating in the video stream presentation (e.g., an option to share the poll results via an instant message, a social media post, etc.).

FIGS. 3A-3F illustrate a series of example graphical user interfaces (GUIs) on the broadcaster client device 106. In particular, FIGS. 3A-3F illustrate that the broadcaster client device 106 includes a display screen 300 that presents a graphical menu interface 302 along with a camera feed 304. For example, FIGS. 3A-3F illustrate various GUIs during a live video stream presentation (e.g., the broadcaster client device 106 has already initiated a broadcast of a video stream prior to providing GUIs illustrated in FIGS. 3A-3F).

As used herein, the camera feed 304 (or video capturing feed) includes video content that the broadcaster client device 106 is providing to the video presentation system 102. In one or more embodiments, the camera feed includes video content that the broadcaster client device 106 is currently capturing using a camera on the broadcaster client device 106. Accordingly, in some examples, the camera feed 304 depicts the video stream on the broadcaster client device 106 as the video presentation system 102 receives the video stream and transmits the video stream to an audience (e.g., viewer client devices 114*a*-114*n*).

As briefly mentioned above, FIG. 3A shows the broadcaster client device 106 causes the display screen 300 to present the graphical menu interface 302. The graphical menu interface 302, for example, can assist the broadcaster 110 in creating a live poll and viewing the live poll during the video stream presentation. As previously mentioned, the graphical menu interface 302 is, in some embodiments, overlaid on the camera feed 304. In these embodiments, the graphical menu interface 302 remains separate from the camera feed 304 and may be manipulated, changed, or modified (e.g., by the viewer broadcaster client device 106 or the video presentation system 102) independently from the camera feed 304.

Figure 3A:
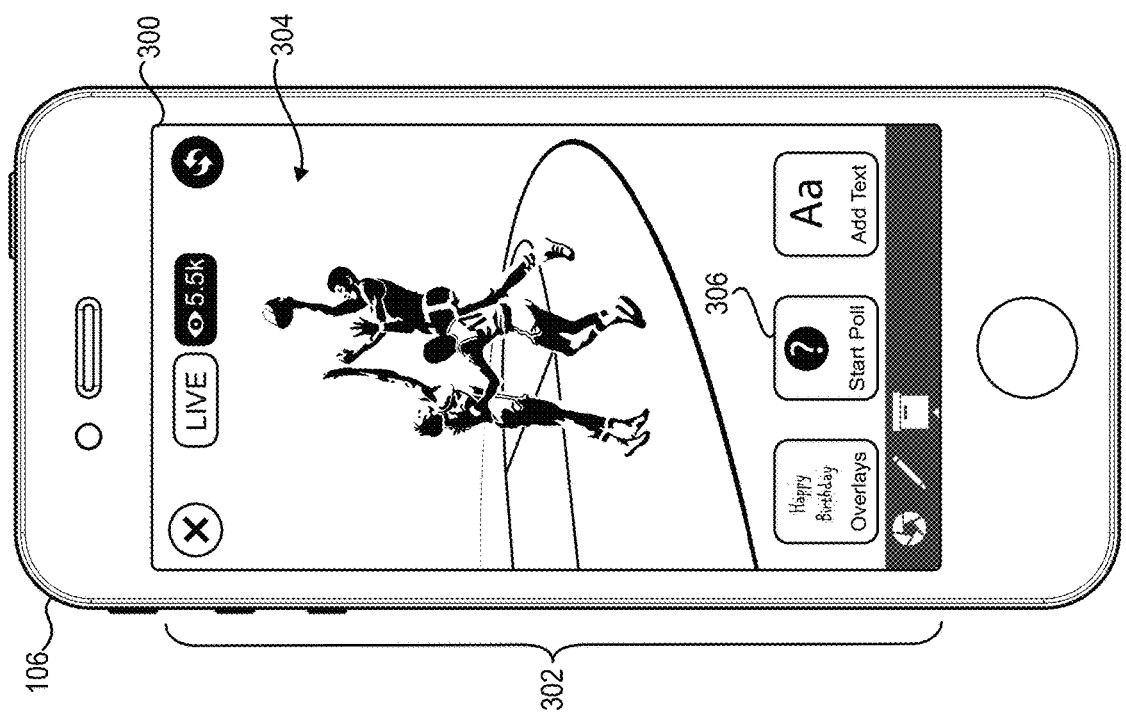
Figure 3F:
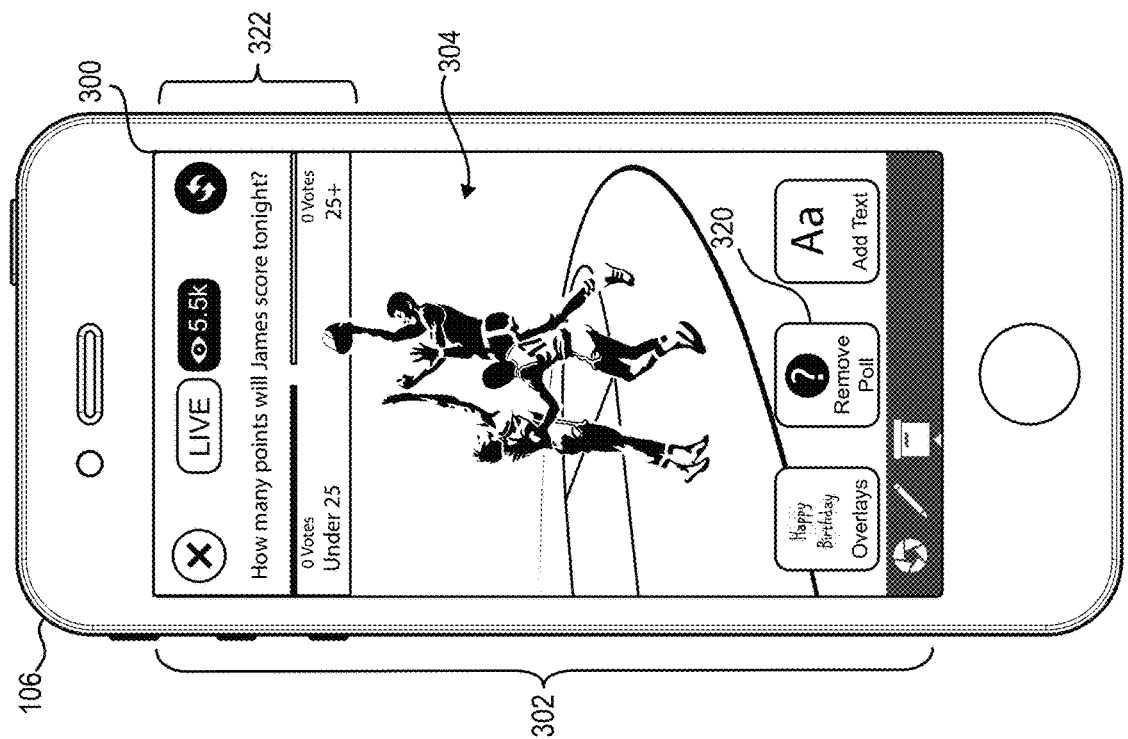

As shown in FIG. 3A, the graphical menu interface 302 includes various interactive elements. For example, the interactive elements may include buttons, links, widgets, or other user-selectable options presented on the broadcaster client device 106. In particular, as shown in FIG. 3A, the graphical menu interface 302 includes an interactive poll element that is a live poll option 306 (e.g., "Start Poll"). As mentioned above, the broadcaster 110 may select the live poll option 306 from within the graphical menu interface 302 (e.g., by a touch input, a voice input, a click input, etc.). Additionally, upon detecting the selection of the live poll option 306, the video presentation application 108 presents a new GUI by changing the graphical menu interface 302 to begin guiding the broadcaster 110 through the steps of creating the live poll, as shown in FIG. 3B.

As mentioned, FIG. 3B illustrates the graphical menu interface 302 displaying elements to guide the broadcaster 110 through creating the live poll. The process of creating the live poll, as illustrated in FIGS. 3B-3D, involves the creation of poll elements. As used herein, and as mentioned above, poll elements include one or more poll questions, one or more answer choices that each correspond to a poll question, and other options such as a poll type, a poll aesthetic, and/or a poll format. In particular, the graphical menu interface 302 of FIG. 3B includes a question input prompt 308 displayed to prompt the broadcaster 110 to input a poll question. The graphical menu interface 302 further includes a keypad 310 by which the broadcaster 110 enters text to form the poll question. As illustrated in FIG. 3B, the graphical menu interface 302 including the question input prompt 308 and the keypad 310 is displayed together with the camera feed 304. As such, the broadcaster client device 106 may simultaneously broadcast the camera feed 304 and enable the broadcaster 110 to create the poll elements.

FIG. 3C shows the broadcaster client device 106 displaying the next step of creating the live poll, i.e., after creating the poll question as shown in FIG. 3B. In particular, FIG. 3C depicts the graphical menu interface 302 presenting a first answer choice prompt 312 and keypad 310. The broadcaster 110 enters the text to form the first answer choice by way of keypad 310 and selects "Next" to transition to the next step of the poll creation process as shown in FIG. 3D. Similar to FIG. 3C, FIG. 3D shows the broadcaster client device 106 with the graphical menu interface 302 and camera feed 304. In particular, in FIG. 3D, the graphical menu interface 302 presents a second answer choice prompt 314 as well as keypad 310 by which the broadcaster client device 106 enables the broadcaster 110 to create the second answer choice.

Significantly, the graphical menu interface 302 allows a broadcasting user to input poll elements to create a live poll while simultaneously broadcasting a video stream. Accordingly, unlike conventional systems, the video presentation system 102 allows a broadcaster to react to content captured in the moment by creating a live poll that is specifically connected to video content within the video stream presentation. In particular, and as shown in FIGS. 3A-3D, the display screen 300 continues to present the camera feed 304 at the same time the display screen 300 provides various elements within the graphical menu interface 302 that allows the broadcaster to provide input and create a live poll. In addition, although the display screen 300 on the broadcasting client device 106 presents the graphical menu interface 302, the viewer client devices 114 do not receive or present the graphical menu interface. Thus, the video stream presentation for the viewer client devices is not interrupted while the broadcaster creates the live poll.

Moreover, in addition to poll questions and answer choices, the poll elements can include a poll type, a poll format, or a poll aesthetic. For example, selecting a poll type may include the broadcaster 110 selecting from a list of poll types such as a vote type or an open question type. Depending on the type of poll selected, the presentation of the live poll may vary. Specifically, creating a vote poll type may involve guiding the broadcaster 110 through creation of a poll question (e.g., as shown in FIG. 3B) and corresponding answer choices (e.g., as shown in FIGS. 3C-3D) in such a way as to allow each poll participant (e.g., viewer 116*a*) to vote for one answer choice. Creating an open question type of poll, on the other hand, may involve guiding the broadcaster 110 through creating a poll question that has no corresponding answer choices, but instead involves presenting a text input field for poll participants to enter a response.

Furthermore, creating a poll format may involve enabling the broadcaster 110 to select from a number of sample layouts of the poll elements or enabling the broadcaster 110 to manually touch-and-drag (or otherwise move/relocate) the poll elements to desired locations on the display. Additionally, creating a poll aesthetic may include enabling the broadcaster 110 to select a color scheme, a poll element style (e.g., a seasonal style, a holiday style, a traditional style, a metallic style, etc.), or other visual appearance option.

Figure 3E:
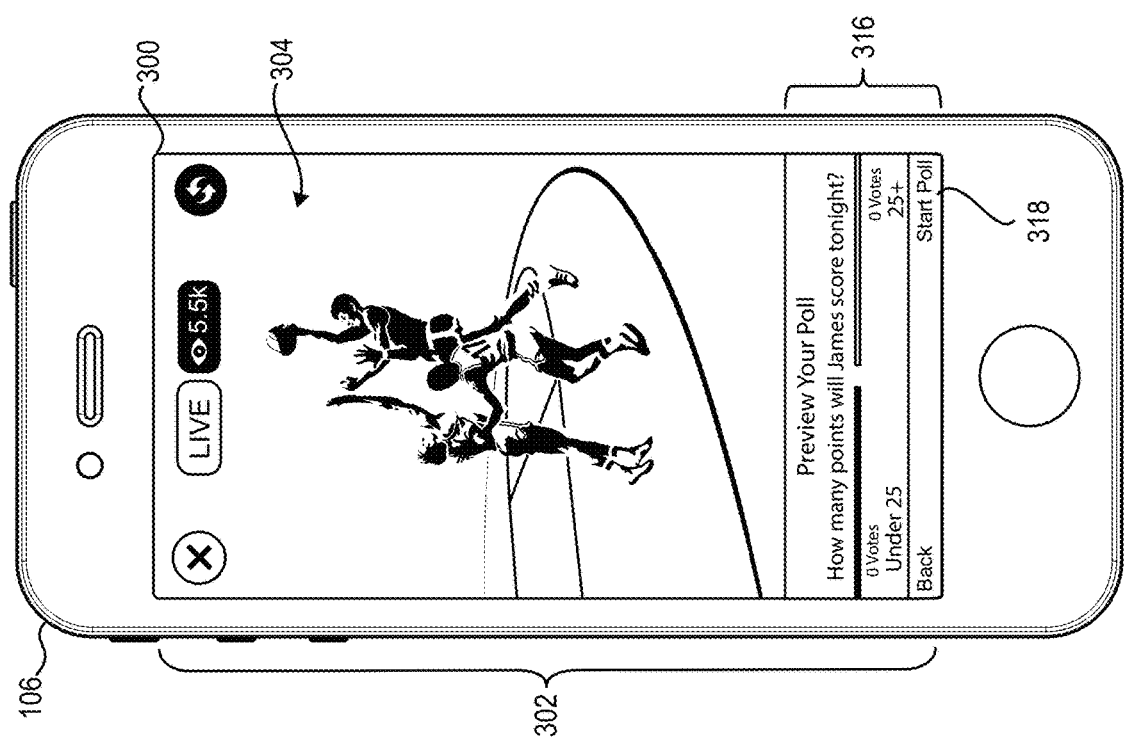

Upon completion of creating the poll elements such as the poll question and answer choices, the broadcaster 110 continues to the next step (e.g., by selecting a "Next" option within the graphical menu interface). As illustrated in FIG. 3E, the graphical menu interface 302 presents the broadcaster 110 with a poll preview 316. Within the poll preview 316, the graphical menu interface 302 enables the broadcaster 110 to review the look and feel of the live poll as the poll will be presented to the audience of viewers. Should the broadcaster 110 be dissatisfied with any part of the poll, the graphical menu interface 302 also enables the broadcaster 110 to return to a previous step in the poll creation process (e.g., as shown in FIGS. 3B-3D) by selecting the "Back" option. As can be seen in the poll preview 316, the poll question, "How many points will James score tonight?" is presented above the two corresponding answer choices, "Under 25," and "25+," respectively. The poll preview 316 also presents a preview of the poll results as a tally of votes and a corresponding graphical bar that adjusts in appearance to favor the answer choice receiving the most votes.

As further illustrated in FIG. 3E, the graphical menu interface 302 includes an option to start the live poll 318 (e.g., "Start Poll"). Once the broadcaster 110 has previewed the live poll and selects to begin the live poll, the broadcaster user device 106 detects that the broadcaster 110 has selected the option to start the live poll 318 and, in response, provides a live poll request, including the poll elements, to the video presentation system 102, as described above with relation to FIGS. 2A-2B. As also described above, the video presentation system 102 receives the live poll request, initiates the live poll, and provides a live poll indication to the viewer client devices (e.g., viewer client devices 114a-114n). With reference to FIGS. 4A-4D, providing the live poll indication causes the viewer client devices to present a graphical poll interface together with the video stream provided by the video presentation system 102.

FIG. 3F illustrates the graphical menu interface 302 presenting a live poll view 322 together with the camera feed 304. Like the poll preview 316 of FIG. 3E, the live poll view 322 depicts the poll elements (e.g., a question and answers). The live poll view 322 also depicts the poll results as viewers respond to the poll. As shown in FIG. 3F, no votes have yet been tallied in this example, but it will be understood that the video presentation system 102 sends information that causes the broadcast client device 106 to update the vote tallies with each viewer response to reflect the total number of votes for each answer choice.

Additionally, the graphical menu interface 302 includes selectable elements such as a poll termination option 320 (e.g., "Remove Poll"). Upon detecting a selection to terminate the live poll, the broadcaster client device 106 sends the termination request to the video presentation system 102. The video presentation system 102 receives the request to terminate the live poll and provides a poll termination indication to the broadcaster client device 106 and the viewer client devices 114a-114n, as discussed above. The poll termination indication causes the broadcaster client device 106 to cease presenting the live poll view 322 within the graphical menu interface 302, and further causes the viewer client devices 114a-114n to cease presenting the graphical poll interface, as discussed in further detail below with reference to FIGS. 4A-4D. Alternatively, in some embodiments the video presentation system 102 provides a poll termination indication upon receiving a request to terminate the video stream, such as, for example, when the broadcaster client device 106 detects a selection by the broadcaster 110 of the "X" to stop broadcasting the camera feed 304.

FIGS. 4A-4D illustrate a series of GUIs as shown on the viewer client device 114a. In particular, FIGS. 4A-4D illustrate a display screen 400 presenting a video stream 404 that the video presentation system 102 provides based on receiving the video stream from broadcaster client device 106. Additionally, FIGS. 4B-4D show a graphical poll interface 402 including various elements that are presented to the viewer 116a to create an engaging user experience while participating in viewing the video stream 404.

Figure 4A:
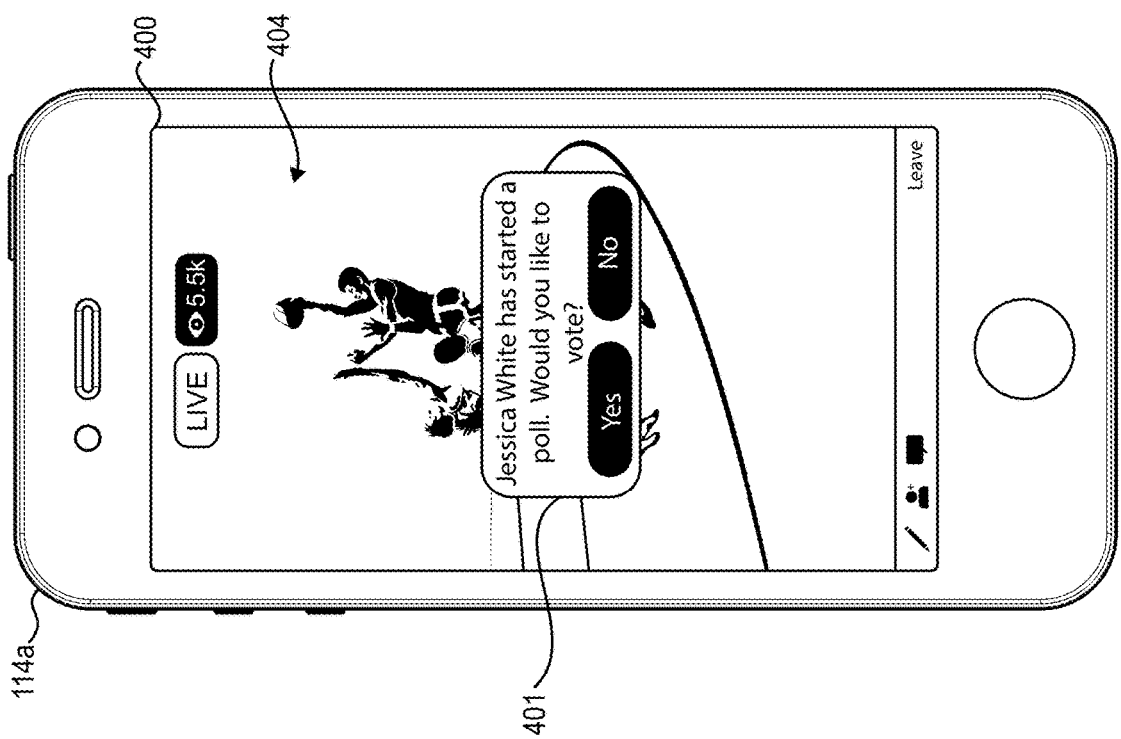

For example, FIG. 4A shows a viewer client device 114a displaying the video stream 404 as well as a poll participation option 401. In particular, the viewer client device 114a presents the poll participation option 401 upon receiving a live poll indication provided by the video presentation system 102. In other words, when the broadcaster 110 of the video stream 404 creates a live poll (e.g., as illustrated in FIGS. 3A-3F), the video presentation system 102 provides an indication to the viewer client device 114a that the poll has started. By presenting the poll participation option 401, the viewer client device 114a enables the viewer 116a to choose whether or not to participate in the live poll.

In some embodiments, should the viewer 116a not wish to participate in the live poll, the video presentation system 102 may nonetheless enable the viewer 116a to continue to view the video stream 404 after selecting not to participate. In other embodiments, the video presentation system 102 may require the viewer 116a to participate in the live poll (e.g., by clicking "Yes"), and may continue only continue to enable the viewer 116a to continue viewing the video stream 404 after opting to participate. Additionally, in one or more embodiments, detecting a selection to not participate causes the viewer client device 114a to cease presenting the video stream 404. In still other embodiments, poll participation is mandatory and no such poll participation option 401 is presented on the viewer client device 114a at all. Instead, the viewer client device 114a may directly display the graphical poll interface 402 as shown in FIG. 4B.

In some embodiments, the video presentation system 102 makes other background determinations before presenting the viewer client device 114a with the poll participation option 401 or the graphical poll interface 402. For example, in one or more embodiments, the video presentation system 102 determines an amount of time that the viewer client device 114a has been streaming the video stream 404. Based on the determination of how long the viewer client device 114a has been streaming the video stream 404, the video presentation system 102 determines whether to provide the live poll indication to cause the viewer client device 114a to present the viewer 116a with the poll participation option 401. In some embodiments, if the viewer client device 114a has streamed the video stream 404 for longer than a threshold duration of time (e.g., 10 seconds, 30 seconds, 1 minute, etc.), then the video presentation system 102 provides the live poll indication to the viewer client device 114a. On the other hand, if the video presentation system 102 determines that the viewer client device 114a has streamed the video stream 404 for shorter than the required threshold duration, then the video presentation system 102 refrains from providing a live poll indication to the viewer client device 404. Thus, as a result of the video presentation system 102 not providing the live poll indication, the viewer client device 114a would not present the poll participation option 401 or the graphical poll interface 402.

Similarly, in the same or other embodiments, the video presentation system 102 determines whether the viewer client device 114a began streaming the video stream 404 before or after the video presentation system 102 initiated the live poll (or else before or after the broadcaster 110 created the live poll, as described above). If the video presentation system 102 determines that the viewer client device 114a began streaming the video stream 404 before the video presentation system 102 initiated the live poll, then the video presentation system 102 provides the live poll indication to the viewer client device 114a which, as mentioned above, causes the viewer client device 114a to present the poll participation option 401 or graphical poll interface 402. Conversely, if the video presentation system 102 determines that the viewer client device 114a began streaming the video stream 404 after the video presentation system 102 initiated the live poll, then the video presentation system 102 refrains from providing the live poll indication to the viewer client device 114a. Thus, in these embodiments, the viewer client device 114a does not present the poll participation option 401 or the graphical poll interface 402 on the display.

The viewer client device 114a may, in some embodiments, still continue to present the video stream 404 without participating in the live poll.

In some embodiments, the video presentation system 102 determines whether the viewer 116a is a quality audience member or a casual audience member. As used herein, a quality audience member is a viewer (e.g., viewer 116a) that has a relationship with the broadcaster 110. In some embodiments, the relationship between the broadcaster 110 and the viewer 116a is based on a number of times the viewer 116a has participated in a live poll (e.g., a live poll created by the broadcaster 110) or a duration of time that the viewer 116a has spent streaming a video stream (e.g., video stream 404 or a video stream on a previous occasion) broadcast by the broadcaster 110. In some embodiments, the video presentation system 102 determines whether the viewer 116a is a quality audience member by checking to see if the broadcaster 110 and the viewer 116a are co-users (e.g., "friends") of a social network.

Additionally or alternatively, the video presentation system 102 identifies and analyzes communications between the broadcaster 110 and the viewer 116a to determine a strength of relationship between the broadcaster 110 and the viewer 116a. If the viewer 116a has a stronger relationship with the broadcaster 110, then the video presentation system 102 is more likely to identify the viewer 116a as a quality audience member. In some embodiments, if the video presentation system 102 identifies previous communications between the broadcaster 110 and the viewer 116a, then the video presentation system 102 determines that the viewer is a quality audience member. In other embodiments, the video presentation system 102 only identifies as a quality audience member those viewers who are "friends" of the broadcaster 110 within a social network. Additionally, a casual audience member may be defined as any viewer who is not a quality audience member.

In one or more embodiments, the video presentation system 102 provides a live poll indication to the viewer client device 114a upon determining that the viewer 116a is a quality audience member. Thus, in these embodiments the viewer client device 114a presents the poll participation option 401 to the viewer 116a upon such a determination. In other embodiments, upon determining that the viewer 116a is a quality audience member, the video presentation system 102 presents the graphical poll interface 402 of FIG. 4B without first presenting the poll participation option 401 of FIG. 4A.

As illustrated in FIG. 4B, the viewer client device 114a presents a graphical poll interface 402 together with the video stream 404. The graphical poll interface 402 includes various elements and/or options therein, including the live poll pane 410 and the comment pane 406. Additionally, the live poll pane 410 includes various poll elements created by the broadcaster 110. For example, the live poll pane 410 includes the poll question, "How many points will James score tonight?" as presented on the viewer client device 114a. The live poll pane 410 further includes the answer choices in the form of user-selectable options such as the "Under 25" option 410a and the "25+" option 410b. By providing the graphical poll interface 402 including the live poll pane 410, the viewer client device 114a enables the viewer 116a to actively participate in an engaging user experience with the broadcaster 110 while viewing the video stream 404.

The live poll pane 410 enables the viewer 116a to see the poll question, and also enables the viewer 116a to respond to the poll question by selecting one of the answer choices 410a or 410b. In one or more embodiments, the graphical poll interface 402 presents the live poll pane 410 to only those viewers who are currently streaming the video stream 404 or who are otherwise determined to be poll participants, as described above. Though FIG. 4B illustrates a single poll question with two answer choices, it will be appreciated that the live poll pane 410 may depict multiple poll questions simultaneously or one after the other, and that each poll question may be presented together with any number of answer choices. It will also be appreciated that, in some embodiments, the live poll pane 410 may show a poll question that elicits an open response. Thus, in these embodiments, the live poll pane 410 may show a text box or other input field by which the viewer 116a may enter text or other input to respond to the poll question in a more free-form, open format (e.g., by way of a keypad like keypad 310 of FIG. 3C).

Additionally, in some embodiments, the graphical poll interface 402 presents alternative means by which the viewer 116a may respond to the poll question. For example, in one or more embodiments, the live poll pane 410 or other portion of the graphical poll interface 402 presents reaction icons (e.g., "Like," etc.) that are selectable by the viewer 116a to respond to the poll question. In these or other embodiments, the viewer client device 114a presents the reaction icons within a pop-up menu to enable the viewer 116a to react or respond to the poll question in much the same way as a user of a social network reacts to a post or comment within a newsfeed or timeline.

As mentioned, the graphical poll interface 402 also includes a comment pane 406. The comment pane 406 shows comments made by viewers within the audience of the video stream 404. In some embodiments, only those viewers currently viewing the video stream 404 may be permitted to make a comment. Additionally, in one or more embodiments, the comments are displayed in order of relevance to the video stream 404. Thus, comments that are more relevant to the content of video stream 404 may be displayed closer to the top of the comment pane 406, whereas comments that are less relevant may be displayed closer to the bottom.

In order to determine which comments are most relevant, the video presentation system 102 analyzes the video and the comments made by viewers to determine which comments are more relevant to the content of the video stream 404. In other embodiments, the comments are displayed in order of relevance to the poll question displayed in the live poll pane 410. In these embodiments, the video presentation system 102 analyzes the poll question and each received comment by parsing the text therein and finding correlations between the poll question and the comments. Indeed, in one or more embodiments, the video presentation system 102 trains a machine learning model to determine the relevance of each comment to the poll question, and the video presentation system 102 ranks the comments accordingly.

In addition to displaying comments made by viewers of the video stream 404, the comment pane 406 also displays other actions taken regarding the video stream 404. For example, in one or more embodiments, the comment pane 406 in FIG. 4B illustrates actions taken by the broadcaster 110 (i.e., "Jessica White") or the viewer 116a or other viewers. As shown, the comment pane 406 presents a notification that "Jessica White started a poll." FIG. 4D illustrates that the comment pane 406 displays a notification confirming a poll response the viewer 116a. As shown, the comment pane 406 displays a notification that the viewer 116a voted for "25+." In the same or other embodiments, the comment pane 406 displays notifications of votes made by other audience members (e.g., viewers other than viewer 116a) as well.

As is also shown by FIG. 4B, the graphical poll interface 402 includes a poll exit option 408. In particular, the poll exit option 408 enables the viewer 116a to leave the poll by clicking or touching the poll exit option 408. In some embodiments, the video presentation system 102 may still provide the viewer client device 114a with the video stream 404 for the viewer 116a to watch even after exiting the poll. In other embodiments, the video presentation system 102 may cease providing the video stream 404 to the viewer client device 114a when the viewer 116a selects the poll exit option 408.

Looking now to FIG. 4C, the graphical poll interface 402 includes a poll confirmation pane 412 in addition to the comment pane 406 and the poll exit option 408. In particular, the poll confirmation pane 412 displays a green checkmark or other visual indication confirming a response submission made by the viewer 116a. In other words, when the viewer client device 114a detects a selection of an answer choice (e.g., answer choice 410a or 410b of FIG. 4B), the live poll pane 410 transitions of FIG. 4B to the poll confirmation pane 412 of FIG. 4C to display a confirmation to the viewer 116a that the viewer client device 114a has detected the response input and sent the response to the video presentation system 102.

The video presentation system 102 receives the poll response sent from the viewer client device 114a in response to detecting the response to the poll. As mentioned above, the video presentation system 102 receives poll responses from multiple audience members (e.g., viewers 116a-116n) and from those poll responses, compiles poll results. In some embodiments, the video presentation system 102 compiles poll results by counting the number of selections made for each answer choice (e.g., answer choices 410a and 410b), as described above. In other embodiments where poll responses are submitted as text responses, the video presentation system 102 compiles poll results by analyzing the text of each response. Upon compiling poll results, the video presentation system 102 provides the poll results to both the broadcaster client device 106, as shown in FIG. 3F, as well as the viewer client device 114a as shown in FIG. 4D.

As described, FIG. 4D illustrates a graphical poll interface 402 including the comment pane 406 as well as a poll results pane 414. In particular, once the video presentation system 102 has received a poll response from the viewer client device 114a, then the video presentation system 102 provides the poll results to the viewer client device 114a. In turn, the viewer client device 114a displays the graphical poll interface 402 of FIG. 4D, transitioning from the poll confirmation pane 412 of FIG. 4C to the poll results pane 414 of FIG. 4D.

In particular, the poll results pane 414 displays the poll results provided by the video presentation system 102. For example, as illustrated in FIG. 4D, the poll results pane 414 illustrates a total count of votes for each of answer choices 410a ("Under 25") and 410b ("25+"). Additionally, the poll results pane 414 also illustrates a graphical bar for each answer choice, where the size (e.g., length) of the graphical bar corresponding to each answer choice represents the fraction of the total poll results that the particular answer choice received. For example, as can be seen in FIG. 4D, "Under 25" has received 47 votes and therefore has a much smaller graphical bar than "25+" which has received 503 votes.

As described above, the broadcaster 110 is able to terminate the poll (e.g., by selecting the "Remove Poll" button 320 of FIG. 3F). Upon termination of the live poll, the video presentation system 102 sends a poll termination indication to the viewer client device 114a, whereupon the viewer client device 114a ceases presenting the graphical poll interface 402, including the comment pane 406, live poll pane 410, etc. In one or more embodiments, however, the video client device 114a may still display the comment pane 406 after termination of the live poll.

Figure 5:
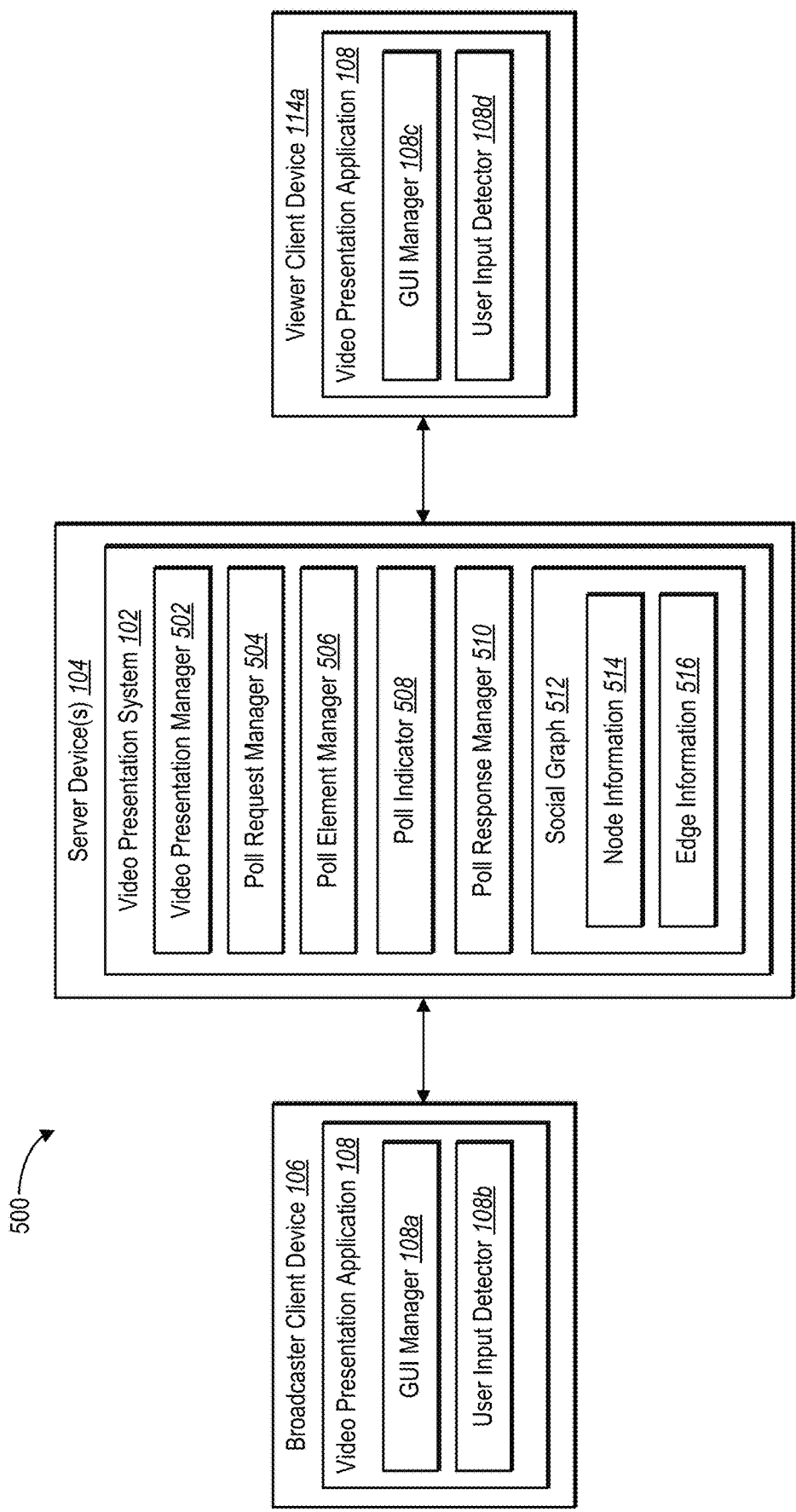
FIG. 5 illustrates a schematic diagram of a video presentation system in accordance with one or more embodiments.

FIG. 5 illustrates a schematic diagram 500 of a video presentation system 102 housed on server device(s) 104 as well as the video presentation application 108 housed on both the broadcaster client device 106 and the viewer client device 114a. The video presentation system 102 can be an example embodiment of the video presentation system as described above. Further, the video presentation system 102 can be executed on a video capturing system, a video broadcasting system, and/or a social networking system, such as the social networking system described with respect to FIGS. 8-9.

As shown in FIG. 5, the video presentation application 108 can include various components such as the GUI manager 108a and the user input detector 108b. From the perspective of the broadcaster client device 106, the GUI manager 108a may manage, provide, display, animate, or otherwise present GUIs on the broadcaster client device 106. In particular, the GUI manager 108a may interact with the user input detector 108b to alter its appearance in response to detecting user input by the broadcaster 110. In some embodiments, as described above, the GUI manager 108a displays the graphical menu interface together with the video capturing or video broadcasting interface. As described above, the GUI manager 108a may present the graphical menu interface as an overlay on top of, and separate from, the camera feed/video capturing interface or else may integrate the graphical menu interface into the video capturing interface. Upon the user input detector 108b detecting user input (e.g., a touch input to start a live poll), the GUI manager 108a may display a GUI to present the broadcaster with option corresponding to the detected input.

In one or more embodiments, the video presentation application includes various overlay templates. Accordingly, upon receiving a live poll indication, the video presentation application accesses an overlay template (e.g., the graphical poll interface) and provides the overlay template for presentation to the viewer device. In addition, the overlay templates can include various fields and the video presentation system 102 can cause the video presentation application to populate the fields within the overlay template with one or more poll elements (e.g., question and answer choices). Accordingly, the video presentation system 102 can provide a live poll indication (e.g., including a poll identifier) and one or more poll elements to a viewer client device, and in response, the viewer client device can access an overlay template (e.g., maintained on the viewer client device) and populate the overlay template with the one or more poll elements.

In addition, in response to the user input detector 108b detecting user input by the broadcaster 110 in the form of touch input or typing input to create a poll question, the GUI manager 108a displays, within a GUI of the video presentation application 108, the question created by the broadcaster 110 and provides the broadcaster 110 with an option to continue through the poll creation process by moving to the next step. In response to continuing to the next step (e.g., by the user input detector 108b detecting an input to do so)

the GUI manager 108a displays one or more interfaces to allow the broadcaster 110 to successively create answer choices to accompany the poll question. The GUI manager 108a may also display a selectable option to start the live poll. Importantly, each of the interfaces displayed by the GUI manager 108a on the broadcaster client device 106 to guide the broadcaster 110 through the poll creation process may be part of the graphical menu interface describe above.

From the perspective of the viewer client device 114a, the GUI manager 108c may manage, display, animate, or otherwise present GUIs on the viewer client device 114a. In particular, the GUI manager 108c may display the video stream that is captured by the broadcaster client device 106 and provided by the video presentation system 102. In conjunction with the video stream, the GUI manager 108c may also present the graphical poll interface. As with GUI manager 108a described above, GUI manager 108c may present the graphical poll interface as an overlay on top of the video stream, or else may integrate the graphical poll interface into the video stream. Additionally, the GUI manager 108c may communicate with the user input detector 108d. In particular, in response to the user input detector 108d detecting user input from viewer 116a in the form of a response to a poll question, the GUI manager 108a may display poll results within the graphical poll interface. As discussed above, the poll results may be a graphical bar or other illustration of the overall audience response to the poll question.

As shown in FIG. 5, the video presentation system 102 can communicate with the video presentation application 108 on both the broadcaster client device 106 and the viewer client device 114a. Additionally, the video presentation system 102 can include various components for performing the processes and features described herein. For example, in the embodiment shown in FIG. 5, the video presentation system 102 includes a video presentation manager 502, a poll request manager 504, a poll element manager 506, a poll indicator 508, a poll response manager 510, and a social graph 512.

The components 502-512 of the video presentation system 102 can comprise software, hardware, or both. For example, the components 502-512 can comprise one or more instructions stored on a computer-readable storage medium and executable by processors of one or more computing devices, such as a client device or server device. When executed by the one or more processors, the computer-executable instructions of the video presentation system 102 can cause the computing device(s) to perform the video presentation and live polling methods described herein. Alternatively, the components 502-512 can comprise hardware such as a special purpose processing device to perform a certain function or group of functions. Alternatively still, the components 502-512 of the video presentation system 102 can comprise a combination of computer-executable instructions and hardware.

As mentioned above, the video presentation system 102 includes a video presentation manager 502. In general, the video presentation manager 502 assists in receiving the video stream from the broadcaster client device 106 and providing the video stream to the viewer client device 114a. In particular, the video presentation manager 502 may simultaneously receive the video stream from the broadcaster client device 106 and transmit the video stream to the viewer client device 114a for a "live" video stream presentation. In other embodiments, the video presentation manager 502 may transmit the video stream to the viewer client device 114a only upon further receiving an indication from the broadcaster client device 106 (e.g., a user input by the broadcaster 110 detected by the user input detector 108b) that the broadcaster 110 wants to broadcast the video stream for viewer 116a to view. In any of these embodiments, the video presentation manager 502 may communicate with the other elements or components of the video presentation system 102 such as the poll element manager 506 discussed below.

The video presentation system 102 also includes a poll request manager 504. In particular, the poll request manager 504 receives, from the broadcaster client device 106, a request to initiate a live poll. Additionally, the poll request manager 504 may identify the poll elements set by the broadcaster 110 at the broadcaster client device 106. In doing so, the poll request manager 504 may identify each poll question and its corresponding answer choices as well as any other settings set by the broadcaster associated with the live poll. The poll request manager 504 may further initiate the live poll by creating a poll identifier and a poll database for storing poll information and managing the live poll as described above.

The video presentation system 102 further includes a poll element manager 506. In particular, the poll element manager 506 can communicate with the GUI manager 108a in the video presentation application 108 on the broadcaster client device 106 as well as the GUI manager 108c in the video presentation application 108 on the viewer client device 114a. By communicating with GUI manager 108a and GUI manager 108c, the poll element manager 506 can provide all poll elements related to the live poll. In other words, the poll element manager 506 can provide the poll questions and corresponding answer choices to the viewer client device 114a. The poll element manager 506 can further communicate with the poll indicator 508 to cause the viewer client device 114a and the broadcaster client device 106 to present the live poll created by the broadcaster 110 at the broadcaster client device 106.

As mentioned and as shown in FIG. 5, the video presentation system 102 also includes a poll indicator 508. In particular, the poll indicator 508 can communicate with the video presentation application 108 on both the broadcaster client device 106 and the viewer client device 114a to cause each respective device to display the poll elements received by the poll element manager 506. For example, the poll indicator 508 can cause the GUI manager 108a to present the poll questions and answer choices within the graphical menu interface on the broadcaster client device 106, and may further cause the GUI manager 108c to present the poll questions and answer choices within the graphical poll interface on the viewer client device 114a.

The video presentation system 102 further includes a poll response manager 510. In particular, the poll response manager 510 receives a poll response from the viewer client device 114a and further compiles poll results based on the received response. The poll response manager 510 also communicates with the poll element manager 506, the GUI manager 108a on the broadcaster client device 106, and the GUI manager 108c on the viewer client device 114a to provide the compiled poll results to the broadcaster client device 106 and the viewer client device 114a. For example, the poll response manager 510 communicates with the GUI manager 108c to cause the viewer client device 114a to present the poll results received from the audience (e.g., viewers 116a-116n), as shown and described above.

In one or more embodiments, the video presentation system also includes a social graph 512. The social graph includes node information 514 and edge information 516.

Node storage of the social graph 512 can store node information 514 comprising nodes for users, nodes for concepts, nodes for transactions, and nodes for items. Edge storage of the social graph 512 can store edge information 516 comprising relationships between nodes and/or actions occurring within the video presentation system 102 or a social networking system. Further detail regarding the social networking system, social graphs, edges, and nodes is presented below with respect to FIGS. 8-9.

Figure 6:
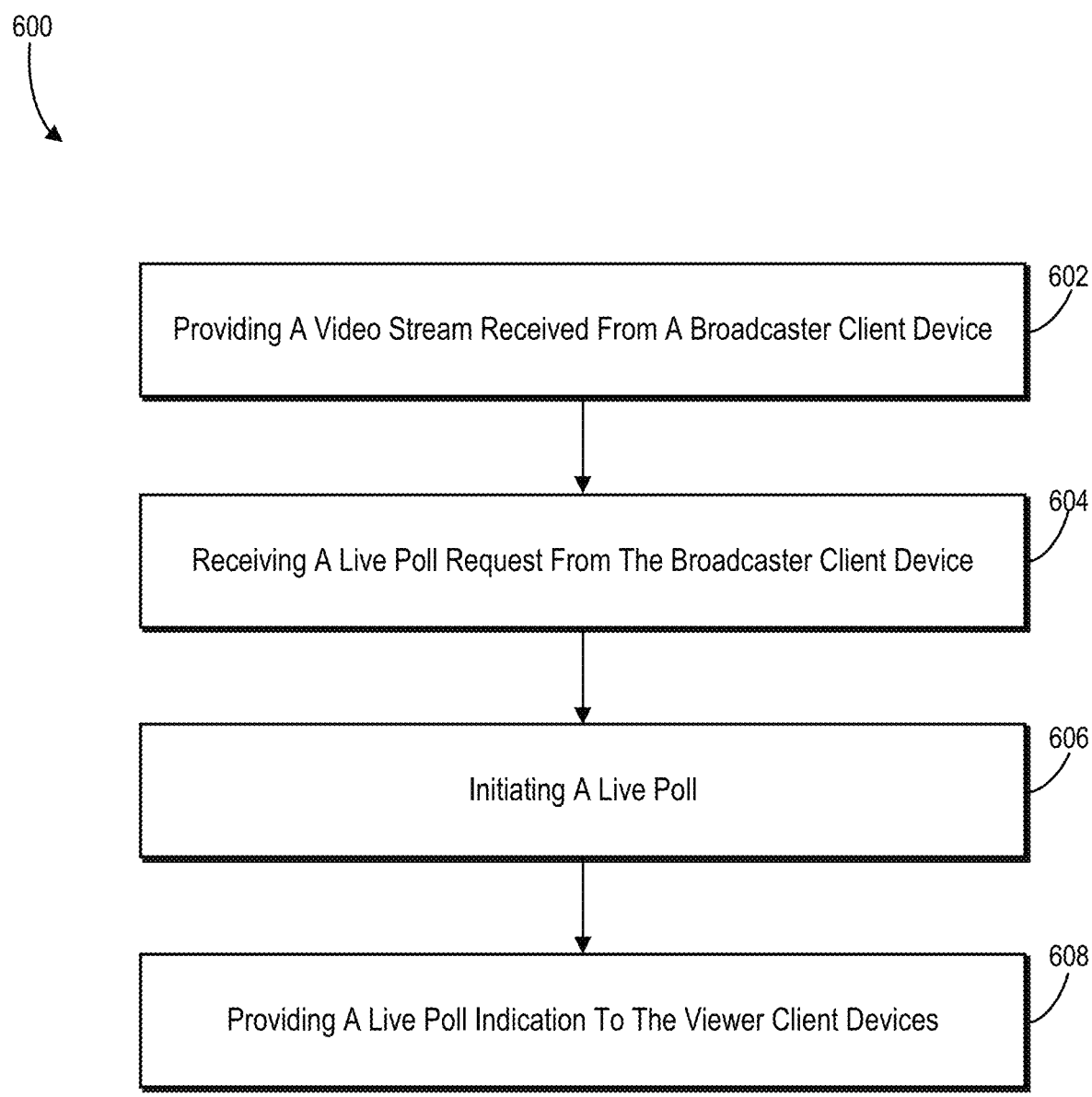
FIG. 6 illustrates a flowchart of a series of acts in a method of providing a live poll within a video presentation in accordance with one or more embodiments.

FIGS. 1-5, the corresponding text, and the examples, provide a number of different systems and devices for providing a live poll in conjunction with a video stream. In addition to the foregoing, embodiments can also be described in terms of flowcharts comprising acts in a method for accomplishing a particular result. For example, FIG. 6 illustrates flowcharts of exemplary methods in accordance with one or more embodiments. The methods described in relation to FIG. 6 may be performed with less or more acts or the acts may be performed in differing orders. Additionally, the acts described herein may be repeated or performed in parallel with one another or in parallel with different instances of the same or similar acts.

FIG. 6 illustrates a flowchart of a series of acts in a method 600 of providing a live poll in conjunction with a video stream. In one or more embodiments, the method 600 is performed in a digital medium environment that includes the video presentation system 102. The method 600 is intended to be illustrative of one or more methods in accordance with the present disclosure, and is not intended to limit potential embodiments. Alternative embodiments can include additional, fewer, or different acts than those articulated in FIG. 6.

FIG. 6 illustrates a flowchart of a method 600 of providing a live poll in conjunction with a video stream presentation. The method 600 includes an act 602 of providing a video stream received from a broadcaster client device. As illustrated by FIG. 6, the method 600 further includes an act 604 of receiving a live poll request from the broadcaster client device. In particular, the act 604 involves receiving a live poll request related to the video stream from the broadcaster client device, wherein the live poll request includes one or more poll elements defined by a broadcasting user associated with the broadcaster client device.

For example, in one or more embodiments the act 604 of receiving the live poll request includes receiving, from the broadcaster client device, an indication that the broadcasting user selected a poll option from within a graphical menu interface overlaid on a camera feed presented on the broadcaster client device. As described above, the graphical menu interface provides a guided process to receive user input that defines the one or more poll elements. Additionally, the one or more poll elements include a question and one or more answer choices corresponding to the question. In the same or other embodiments, the one or more poll elements further include a poll type, a poll formant, or a poll aesthetic, as described in further detail above.

As further illustrated by FIG. 6, the method 600 also includes an act 606 of initiating a live poll. In particular, the act 606 involves, based on receiving the live poll request, initiating, by at least one processor, a live poll in accordance with the one or more poll elements. For example, in one or more embodiments the act 606 of initiating the live poll includes creating a poll identifier to identify the live poll and generating a poll data structure to store poll information, wherein the poll information includes one or more of the live poll indication, the one or more poll elements, one or more poll responses, or a poll result.

As shown by FIG. 6, the method 600 includes an act 608 of providing a live poll indication to the viewer client devices. In particular, the act 608 involves, in response to initiating the live poll, providing, to the plurality of viewer client devices, a live poll indication that causes each of the plurality of viewer client devices to present a graphical poll interface with the video stream. For example, in one or more embodiments the act 608 of providing the live poll indication that causes each of the plurality of viewer client devices to present the graphical poll interface with the video stream further includes causing each of the plurality of viewer client devices to overlay the graphical poll interface on a presentation of the video stream.

Additionally, in the same or other embodiments the act 608 of providing the live poll indication further includes providing the question and the one or more answer choices (i.e., the poll elements) to each of the plurality of viewer client devices. Furthermore, the graphical poll interface includes a presentation of the question and one or more selectable elements associated with the one or more answer choices corresponding to the question. As described above, in some embodiments, the one or more selectable elements associated with the one or more answer choices each include a reaction icon.

In one or more embodiments, the method 600 further includes an act of receiving a poll response from a viewer client device from the plurality of viewer client devices. In the same or other embodiments, the method 600 still further includes an act of updating, in response to the poll response, poll results to reflect the poll response received from the viewer client device. Furthermore, in some embodiments the method 600 includes an act of providing the poll results to the plurality of viewer client devices, wherein providing the poll results causes each of the plurality of viewer client devices to display the poll results within the graphical poll interface.

Additionally, in one or more embodiments the method 600 includes acts of receiving a comment from the viewer client device from the plurality of viewer client devices and analyzing the comment to determine a relevance of the comment in relation to the video stream. In the same or other embodiments, the method 600 also includes acts of, in response to determining that the comment is more relevant to the video stream, assigning a higher priority to the comment, and, in response to determining that the comment is less relevant to the video stream, assigning a lower priority to the comment. Moreover, in some embodiments the method 600 includes an act of providing the comment to the plurality of viewer client devices, wherein providing the comment causes each of the plurality of viewer client devices to display the comment.

In one or more embodiments, the method 600 includes an act of receiving, from the broadcaster client device, a request to terminate the live poll related to the video stream, and further includes an act of, in response to receiving the request to terminate the live poll, providing, to the plurality of viewer client devices, a poll termination indication that causes each of the plurality of viewer client devices to cease to present the graphical poll interface with the video stream. In the same or other embodiments, the method 600 further includes an act of terminating the live poll when the video stream is terminated.

The method 600 may further include an act of determining that a viewer client device of the plurality of viewer client devices has streamed the video for less than a threshold time and, in response to the determination that the viewer client device has streamed the video stream for less than the threshold time, refraining from providing the live poll indication to the viewer client device.

In one or more embodiments, the method 600 includes an act of determining, based on one or more viewer attributes, that a first viewer associated with a first viewer client device of the plurality of viewer client devices is a quality audience member. As described above, a quality audience member is an audience member (e.g., viewer) that has a relationship with the broadcaster. In the same or other embodiments, the method 600 also includes determining, based on the one or more viewer attributes, that a second viewer associated with a second viewer client device of the plurality of viewer client devices is a causal audience member. The method 600 further includes an act of, in response to determining that the first viewer is a quality audience member, providing the live poll indication to the first viewer client device, and still further includes an act of, in response to determining that the second viewer is a casual audience member, refraining from providing the live poll indication to the second viewer client device.

Additionally or alternatively, the method 600 may further include an act of providing, to a second plurality of viewer client devices, the video stream received from the broadcaster client device. Additionally or alternatively still, the method 600 includes acts of determining that the second plurality of viewer client devices joined the video stream after the live poll was terminated, and withholding participation in the live poll from the second plurality of viewer client devices based on determining that the second plurality of viewer client devices joined the video stream after the live poll was initiated.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
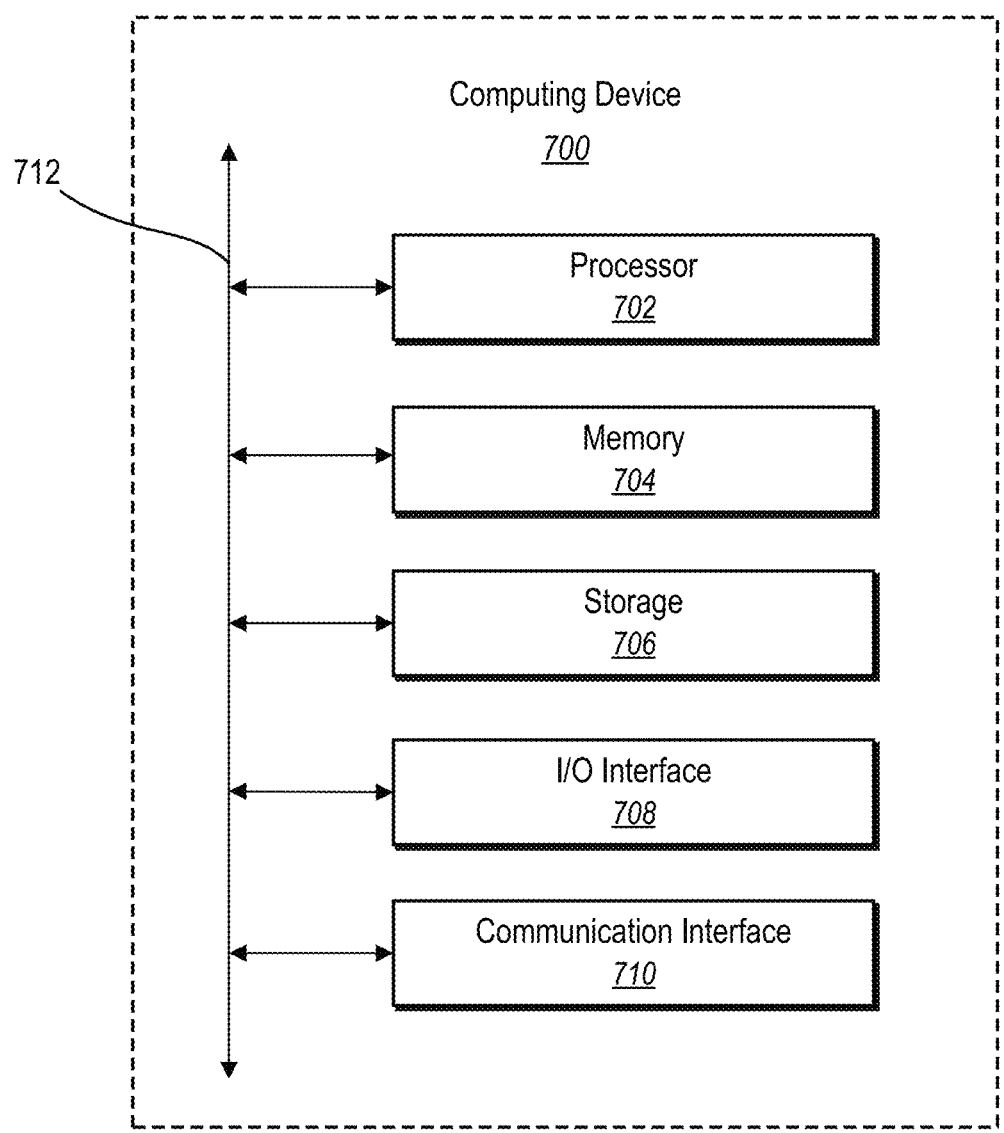
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the payment system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touchscreen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the payment system 100 can comprise a social-networking system. A social-networking system may enable its users (such as persons or organizations) to interact with the system and with each other. As mentioned above, the payment system 100 can comprise a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 8:
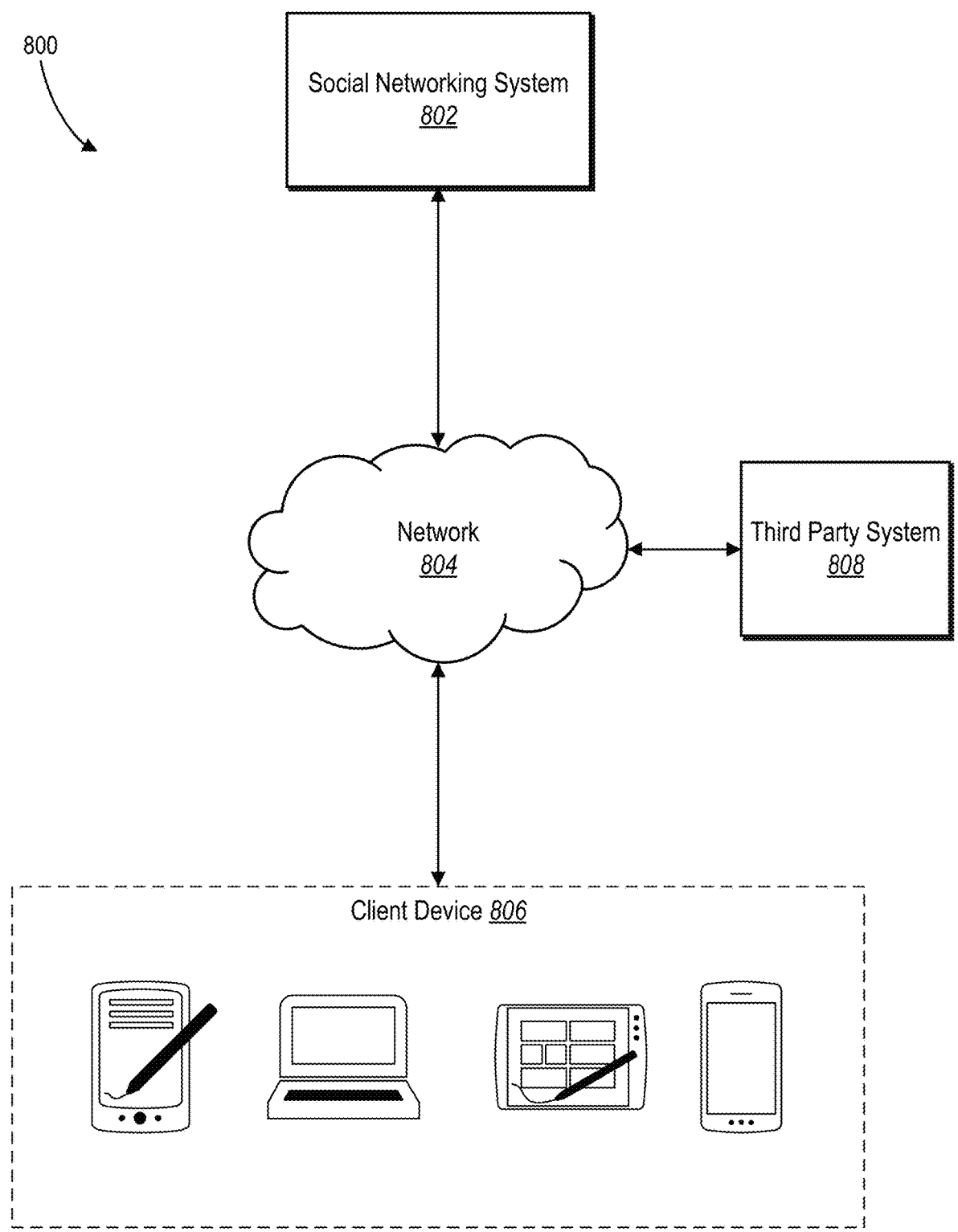
FIG. 8 illustrates an example social network system that can include a video presentation system in accordance with one or more embodiments.

FIG. 8 illustrates an example network environment 800 of a social-networking system. Network environment 800 includes a client system 806, a social-networking system 802, and a third-party system 808 connected to each other by a network 804. Although FIG. 8 illustrates a particular arrangement of client system 806, social-networking system 802, third-party system 808, and network 804, this disclosure contemplates any suitable arrangement of client system 806, social-networking system 802, third-party system 808, and network 804. As an example and not by way of limitation, two or more of client system 806, social-networking system 802, and third-party system 808 may be connected to each other directly, bypassing network 804. As another example, two or more of client system 806, social-networking system 802, and third-party system 808 may be physically or logically co-located with each other in whole or in part. Moreover, although FIG. 8 illustrates a particular number of client systems 806, social-networking systems 802, third-party systems 808, and networks 804, this disclosure contemplates any suitable number of client systems 806, social-networking systems 802, third-party systems 808, and networks 804. As an example and not by way of limitation, network environment 800 may include multiple client system 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social-networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include any of the computing devices discussed above in relation to FIG. 8. A client system 806 may enable a network user at client system 806 to access network 804. A client system 806 may enable its user to communicate with other users at other client systems 806.

In particular embodiments, client system 806 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client system 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client systems 806 or one or more third-party system 808 via network 804. The web server may include a mail server or other messaging functionality for receiving and routing messages between social-networking system 802 and one or more client systems 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
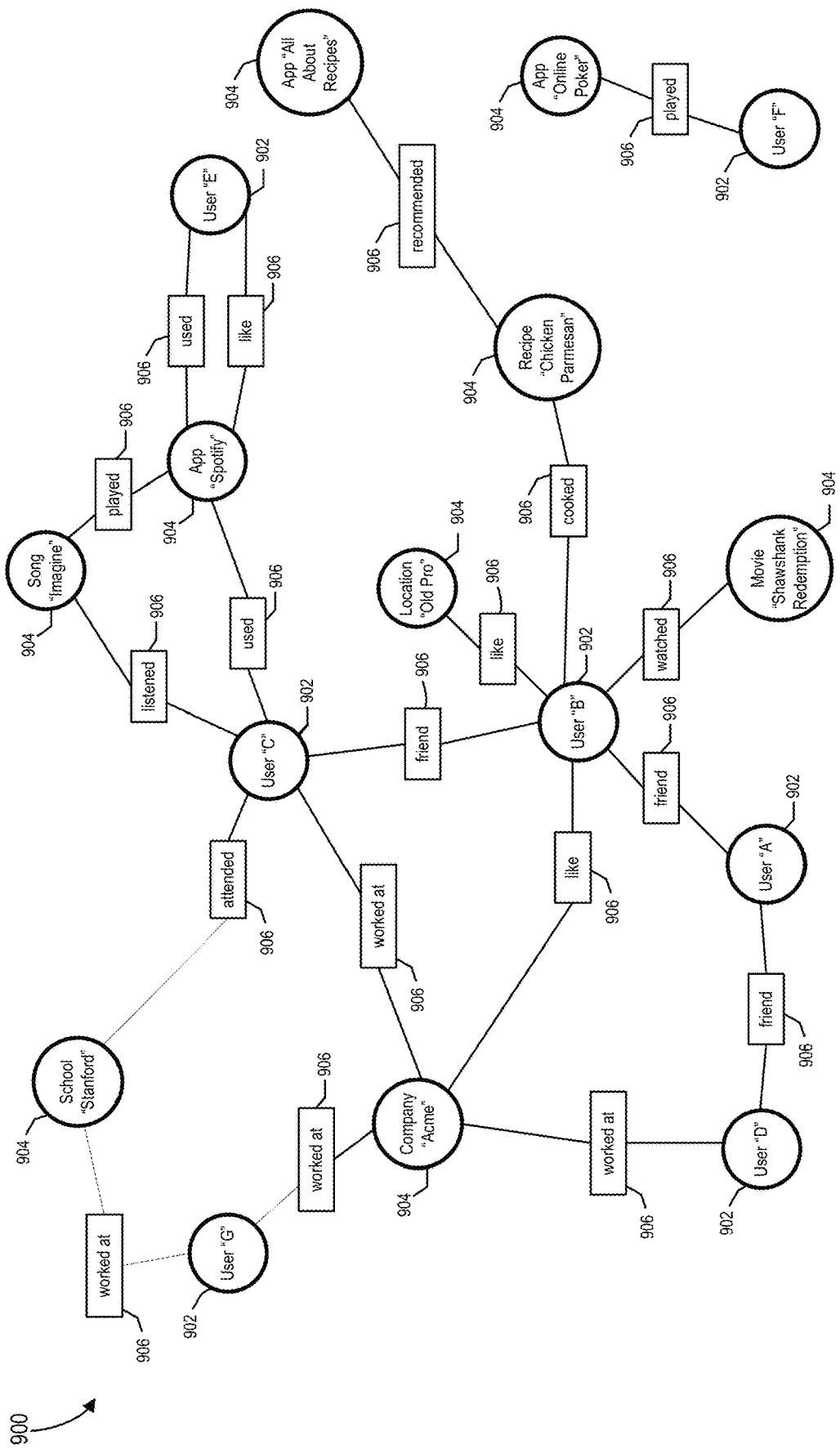
FIG. 9 illustrates a social graph in accordance with one or more embodiments.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B."

Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition, or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
receiving, at a server device, a video stream of a camera feed captured by a broadcaster mobile device;
providing, based on receiving the video stream from the broadcaster mobile device, a graphical menu interface for display via the broadcaster mobile device and comprising a live poll option overlaid on a presentation of the camera feed;
in response to user interaction selecting the live poll option, providing a poll creation interface overlaid on the presentation of the camera feed and comprising a live poll initiation option together with user input fields for entering questions and answer choices;
generating, for simultaneous presentation with the video stream, a live poll comprising a question and at least one answer choice based on user interaction with the user input fields of the poll creation interface;
determining that a viewer associated with a viewer client device is a quality audience member by determining that the viewer has participated in at least a threshold number of live polls created by a broadcaster associated with the broadcaster mobile device;
determining that a second viewer associated with a second viewer client device is a casual audience member by determining that the second viewer has not participated in at least the threshold number of live polls created by the broadcaster associated with the broadcaster mobile device;
based on user interaction selecting the live poll initiation option from the poll creation interface and in response to determining that the viewer is a quality audience member, providing, for display on the viewer client device, the question and the at least one answer choice of the live poll within a live poll pane overlaid on a presentation of the video stream displayed via the viewer client device; and
in response to determining that the second viewer is a casual audience member, refraining from providing the question and the at least one answer choice of the live poll to the second viewer client device.

2. The method of claim 1, wherein the at least one answer choice is selectable within the live poll pane displayed via the viewer client device.

3. The method of claim 1, further comprising creating a poll identifier to identify the live poll within a poll database.

4. The method of claim 3, wherein creating the poll identifier comprises creating the poll identifier in response to receiving, from the broadcaster mobile device, an indication of the user interaction with the live poll option.

5. The method of claim 1, wherein the live poll pane is overlaid on the presentation of the video stream displayed via the viewer client device such that the live poll pane obscures a portion of the video stream.

6. The method of claim 1, further comprising providing the live poll for display simultaneously with the video stream, wherein the live poll is displayed via the broadcaster mobile device by simultaneously presenting the question and the at least one answer choice together.

7. The method of claim 1, further comprising providing, in response to the user interaction selecting the live poll initiation option, a live poll notification for display via the viewer client device and indicating that the broadcaster mobile device initiated the live poll.

8. The method of claim 1, wherein the at least one answer choice displayed within the live poll pane on the viewer client device comprises a reaction icon.

9. The method of claim 1, further comprising providing selectable options for a poll type, a poll format, and a poll aesthetic within the poll creation interface overlaid on the presentation of the camera feed on the broadcaster mobile device.

10. The method of claim 1, further comprising:
receiving a poll response from the viewer client device;
generating, in response to the poll response, poll results to reflect the poll response received from the viewer client device; and
providing the poll results for display on the broadcaster mobile device and the viewer client device.

11. The method of claim 1, further comprising:
receiving a comment from the viewer client device;
determining a relevance of the comment in relation to the video stream;

ranking the comment relative to other comments based on the relevance of the comment in relation to the video stream; and providing the comment for display on the viewer client device above comments with lower relevance rankings and below comments with higher relevance rankings.

12. The method of claim 1, further comprising:

receiving, from the broadcaster mobile device, a request to terminate the live poll;

in response to receiving the request to terminate the live poll, providing, to the viewer client device, a poll termination indication that causes the viewer client device to cease presenting the live poll pane.

13. The method of claim 1, further comprising terminating the live poll in response to detecting that the broadcaster mobile device terminates the video stream.

14. The method of claim 1, further comprising:

determining that the viewer client device has streamed the video stream for less than a threshold time; and in response determining that the viewer client device has streamed the video stream for less than the threshold time, refraining from providing the question and the at least one answer choice of the live poll to the viewer client device.

15. The method of claim 1, further comprising providing, for display on the viewer client device in response to the user interaction selecting the live poll initiation option and in response to determining that the viewer is a quality audience member, a poll participation option selectable to participate in the live poll.

16. The method of claim 1, further comprising:

providing, to a second viewer client device, the video stream received from the broadcaster mobile device, determining that the second viewer client device began streaming the video stream after the user interaction selecting the live poll initiation option; and refraining from providing the question and the at least one answer choice of the live poll to the second viewer client device based on determining that the second viewer client device began streaming the video stream after the user interaction.

17. A computer-readable storage medium having stored thereon computer-executable instructions that, when executed by a processor, cause a computer to:

receive a video stream of a camera feed captured by a broadcaster mobile device;

provide, based on receiving the video stream from the broadcaster mobile device, a graphical menu interface for display via the broadcaster mobile device and comprising a live poll option overlaid on a presentation of the camera feed;

in response to user interaction selecting the live poll option, provide a poll creation interface overlaid on the presentation of the camera feed and comprising a live poll initiation option together with user input fields for entering questions and answer choices;

generate, for simultaneous presentation with the video stream, a live poll comprising a question and at least one answer choice based on user interaction with the user input fields of the poll creation interface;

determine that a viewer associated with a viewer client device is a quality audience member by determining that the viewer has participated in at least a threshold number of live polls created by a broadcaster associated with the broadcaster mobile device;

determine that a second viewer associated with a second viewer client device is a casual audience member by determining that the second viewer has not participated in at least the threshold number of live polls created by the broadcaster associated with the broadcaster mobile device;

based on user interaction selecting the live poll initiation option from the poll creation interface and in response to determining that the viewer is a quality audience member, provide, for display on the viewer client device, the question and the at least one answer choice of the live poll within a live poll pane overlaid on a presentation of the video stream displayed via the viewer client device; and in response to determining that the second viewer is a casual audience member, refrain from providing the question and the at least one answer choice of the live poll to the second viewer client device.

18. The computer-readable storage medium of claim 17, wherein the at least one answer choice is selectable within the live poll pane displayed via the viewer client device.

19. A system comprising:

a computing device comprising a processor; and a non-transitory computer-readable medium storing instructions that, when executed by the processor, cause the system to:

receive a video stream of a camera feed captured by a broadcaster mobile device;

provide, based on receiving the video stream from the broadcaster mobile device, a graphical menu interface for display via the broadcaster mobile device and comprising a live poll option overlaid on a presentation of the camera feed;

in response to user interaction selecting the live poll option, provide a poll creation interface overlaid on the presentation of the camera feed and comprising a live poll initiation option together with user input fields for entering questions and answer choices;

generate, for simultaneous presentation with the video stream, a live poll comprising a question and at least one answer choice based on user interaction with the user input fields of the poll creation interface;

determine that a viewer associated with a viewer client device is a quality audience member by determining that the viewer has participated in at least a threshold number of live polls created by a broadcaster associated with the broadcaster mobile device;

determine that a second viewer associated with a second viewer client device is a casual audience member by determining that the second viewer has not participated in at least the threshold number of live polls created by the broadcaster associated with the broadcaster mobile device;

based on user interaction selecting the live poll initiation option from the poll creation interface, provide, for display on a viewer client device, the question and the at least one answer choice of the live poll within a live poll pane overlaid on a presentation of the video stream displayed via the viewer client device; and in response to determining that the second viewer is a casual audience member, refrain from providing the question and the at least one answer choice of the live poll to the second viewer client device.

20. The system of claim 19, wherein the at least one answer choice is selectable within the live poll pane displayed via the viewer client device.

* * * * *